United States Patent
Kwak

(10) Patent No.: US 12,430,007 B2
(45) Date of Patent: Sep. 30, 2025

(54) ELECTRONIC DEVICE INCLUDING DEFORMABLE DISPLAY AND OPERATING METHOD THEREOF

(71) Applicant: SAMSUNG ELECTRONICS CO., LTD., Suwon-si (KR)

(72) Inventor: Taewon Kwak, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/988,590

(22) Filed: Nov. 16, 2022

(65) Prior Publication Data

US 2023/0168793 A1 Jun. 1, 2023

Related U.S. Application Data

(63) Continuation of application No. PCT/KR2022/016672, filed on Oct. 28, 2022.

(30) Foreign Application Priority Data

Nov. 29, 2021 (KR) .......................... 10-2021-0167287

(51) Int. Cl.
G06F 3/0484 (2022.01)
G06F 3/04883 (2022.01)

(52) U.S. Cl.
CPC ........ G06F 3/0484 (2013.01); G06F 3/04883 (2013.01)

(58) Field of Classification Search
CPC .. G06F 3/0484; G06F 3/04883; G06F 3/0488; G06F 1/1641; G06F 3/03545
See application file for complete search history.

(56) References Cited

U.S. PATENT DOCUMENTS 6,411,285 B1 6/2002 Miyazawa
6,903,730 B2 6/2005 Mathews et al.
(Continued)

FOREIGN PATENT DOCUMENTS

JP 2000267813 A 9/2000
JP 2014139759 A 7/2014
(Continued)

OTHER PUBLICATIONS

International Search Report and Written Opinion for International Application No. PCT/KR2022/016672; International Filing Date Oct. 28, 2022; Date of Mailing Feb. 3, 2023; 8 Pages.

*Primary Examiner* — Nhat Huy T Nguyen
(74) *Attorney, Agent, or Firm* — CANTOR COLBURN LLP

(57) ABSTRACT

An electronic device includes a display and a processor. The processor detects movement of an input using a digital pen on the display, determines whether the movement of the input using the digital pen occurs in a hinge area of the display, and determines whether the input using the digital pen needs correcting when it is determined that the movement occurs in the hinge area. The processor identifies an intensity of the input using the digital pen when it is determined that the input needs correcting, identifies a position of the input using the digital pen and a position at which hovering about the input occurs, and corrects a coordinate of the input by using the coordinate of the input of which the intensity is identified and a coordinate of the position at which the hovering occurs.

14 Claims, 24 Drawing Sheets

(56) References Cited

U.S. PATENT DOCUMENTS

| | | | |
|---|---|---|---|
| 10,261,685 B2 | 4/2019 | Deselaers et al. | |
| 10,318,034 B1 * | 6/2019 | Hauenstein | G06F 3/0488 |
| 10,983,635 B2 | 4/2021 | Kobayashi | |
| 2010/0103133 A1 | 4/2010 | Park et al. | |
| 2014/0015782 A1 | 1/2014 | Kim et al. | |
| 2014/0204038 A1 | 7/2014 | Ohba et al. | |
| 2014/0285422 A1 | 9/2014 | Kang et al. | |
| 2014/0354589 A1 | 12/2014 | Ahn | |
| 2015/0220171 A1 | 8/2015 | Cho | |
| 2015/0220195 A1 | 8/2015 | Jin et al. | |
| 2017/0102738 A1 * | 4/2017 | Park | G06F 3/04883 |
| 2018/0329574 A1 * | 11/2018 | Klein | G06F 1/1677 |
| 2020/0050350 A1 | 2/2020 | Lee et al. | |
| 2020/0192547 A1 * | 6/2020 | Kim | G06F 1/1641 |
| 2020/0310619 A1 | 10/2020 | Gao | |
| 2021/0026472 A1 | 1/2021 | Parker et al. | |
| 2021/0096742 A1 | 4/2021 | Yoon et al. | |

FOREIGN PATENT DOCUMENTS

| | | |
|---|---|---|
| KR | 20140073225 A | 6/2014 |
| KR | 101542129 B1 | 8/2015 |
| KR | 20150092962 A | 8/2015 |
| KR | 20170043076 A | 4/2017 |
| KR | 20200017267 A | 2/2020 |
| KR | 102109649 B1 | 5/2020 |
| KR | 102226166 B1 | 3/2021 |
| KR | 20210038151 A | 4/2021 |

* cited by examiner

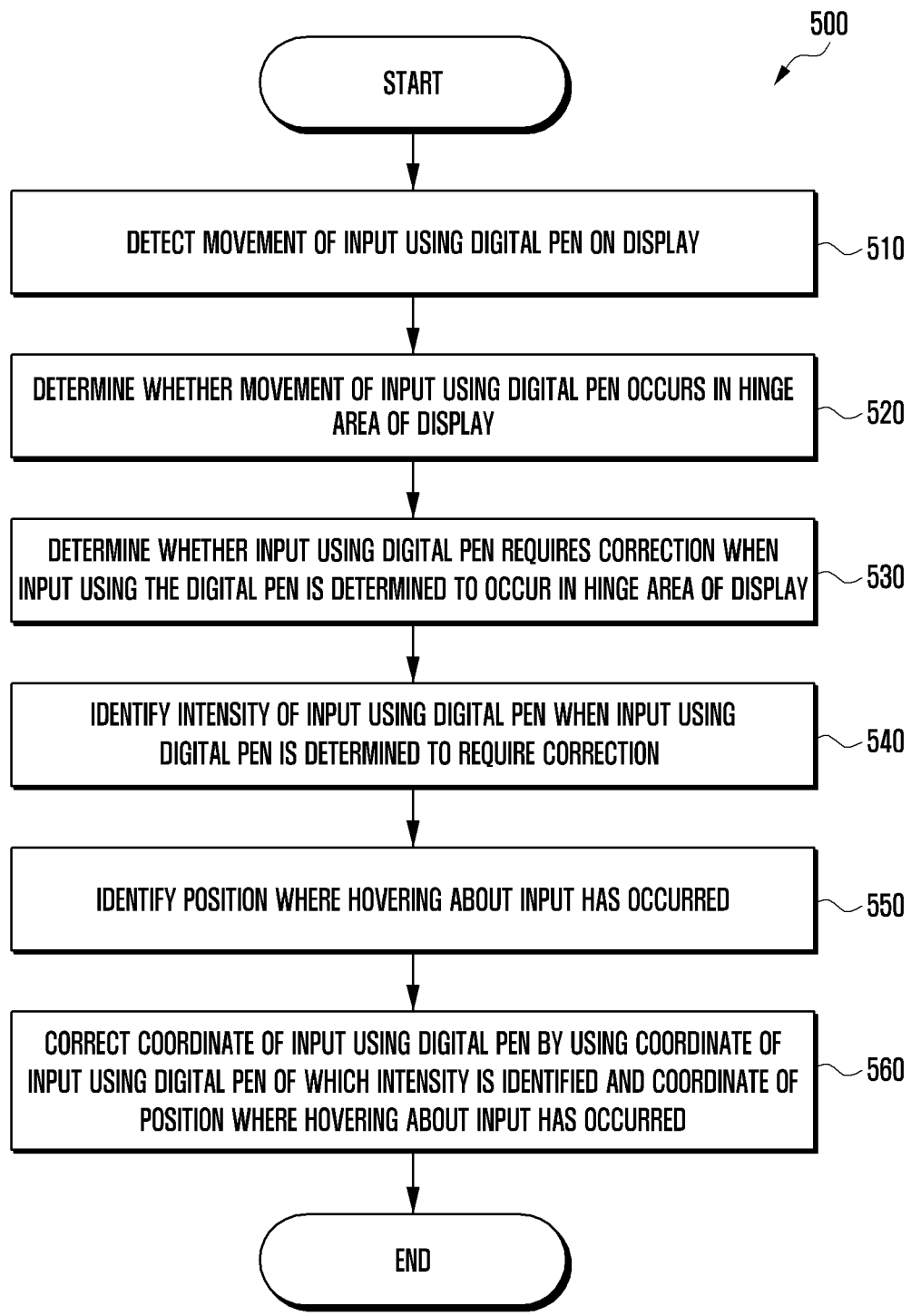

ELECTRONIC DEVICE INCLUDING DEFORMABLE DISPLAY AND OPERATING METHOD THEREOF

CROSS-REFERENCE TO RELATED APPLICATION (S

This application is a continuation application, claiming priority under § 365(c), of an International Application No. PCT/KR2022/016672, filed on Oct. 28, 2022, which is based on and claims the benefit of a Korean patent application number 10-2021-0167287, filed on Nov. 29, 2021, in the Korean Intellectual Property Office, the disclosure of which is incorporated by reference herein in its entirety.

TECHNICAL FIELD

Various embodiments of the disclosure relate to an electronic device including a deformable display and an operating method thereof.

BACKGROUND ART

Recently, various types of electronic devices have been developed. As various types of displays which are bendable, foldable, or rollable have been developed, the shapes of electronic devices are diversified. A bendable, foldable, or rollable display may also receive a touch input by a user, and an electronic device may perform an operation, based on the received touch input by the user. The user may directly use a body part or may use a tool, such as a pen, to perform an input into the electronic device.

DISCLOSURE OF INVENTION

Technical Problem

In a foldable electronic device, a display may be folded and may thus also have a hinge area. In the display, the hinge area may have a different physical curvature and/or shape compared to other areas than the hinge area, and thus an error may occur in an input using a pen. The electronic device may also receive tracking of the input using the pen as an input in addition to the input using the pen, and thus an error may also occur in the electronic device recognizing the input using the pen/tracking of the input using the pen. The disclosure may provide a method for reducing errors in an input using a pen/tracking of the input using the pen received in a deformable area (e.g., a hinge area) of a deformable (e.g., foldable) display, and an electronic device using the same.

Solution to Problem

An electronic device according to various embodiments of the disclosure includes a display and a processor, where the processor detects movement of an input using a digital pen on the display, determines whether the movement of the input using the digital pen occurs in a hinge area of the display, and determines whether the input using the digital pen needs correcting when it is determined that the movement occurs in the hinge area. The processor identifies an intensity of the input using the digital pen when it is determined that the input needs correcting, identifies a position of the input using the digital pen and a position at which hovering about the input occurs, and corrects a coordinate of the input by using the coordinate of the input of which the intensity is identified and a coordinate of the position at which the hovering occurs.

An operating method of an electronic device according to various embodiments of the disclosure includes detecting movement of an input using a digital pen on a display, determining whether the movement of the input using the digital pen occurs in a hinge area of the display, and determining whether the input using the digital pen needs correcting when it is determined that the movement occurs in the hinge area. The method also includes identifying an intensity of the input using the digital pen when it is determined that the input needs correcting, identifying a position of the input using the digital pen and a position at which hovering about the input occurs, and correcting a coordinate of the input by using the coordinate of the input of which the intensity is identified and a coordinate of the position at which the hovering occurs.

Advantageous Effects of Invention

According to various embodiments of the disclosure, when an electronic device includes a deformable display, it is possible to reduce errors in an input using a pen/tracking of the input using the pen received in a deformable area of the display.

BRIEF DESCRIPTION OF DRAWINGS

FIG. 5 is a flowchart of an electronic device correcting an input using a digital pen received in a hinge area according to various embodiments of the disclosure;

MODE FOR THE INVENTION

Figure 1:
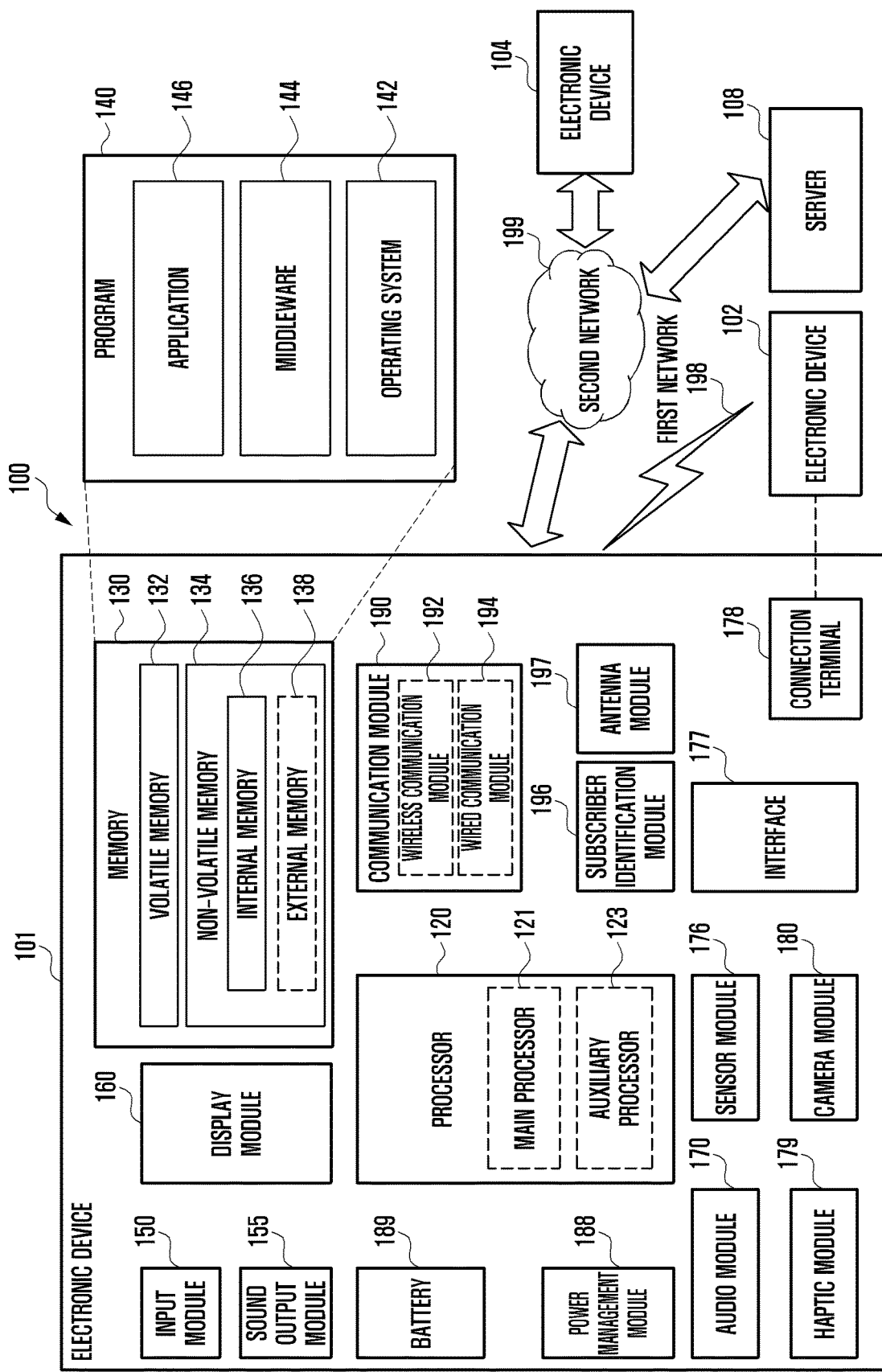
FIG. 1 is a block diagram of an electronic device in a network environment according to various embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
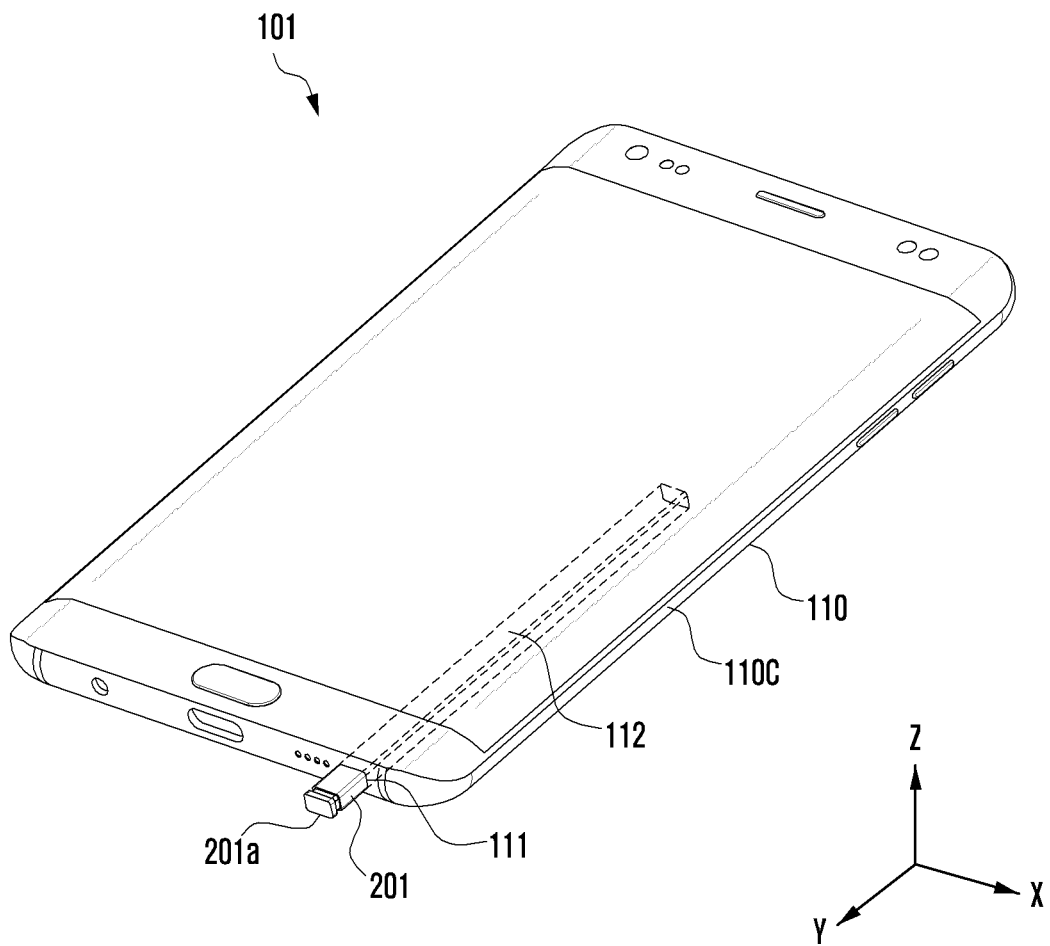
FIG. 2A is a perspective view of an electronic device including a digital pen according to an embodiment.

FIG. 2A is a perspective view of an electronic device including a digital pen according to an embodiment.

Referring to FIG. 2A, the electronic device (e.g., the electronic device 101 of FIG. 1) according to the embodiment may include at least some of components illustrated in FIG. 1, and may include a structure in which the digital pen 201 (e.g., a stylus pen) is insertable. The electronic device 101 may include a housing 110, and a portion of the housing, for example, a portion of a lateral side 110C, may include a hole 111. The electronic device 101 may include a storage space 112 connected with the hole 111, and the digital pen 201 may be inserted into the storage space 112. According to the illustrated embodiment, the digital pen 201 may include a pressable button 201a at one end in order to easily take the digital pen 201 out of the storage space 112 of the electronic device 101. When the button 201a is pressed, repulsion mechanisms (e.g., at least one spring) configured in association with the button 201a may operate, so that the digital pen 201 may be released from the storage space 112.

Figure 2B:
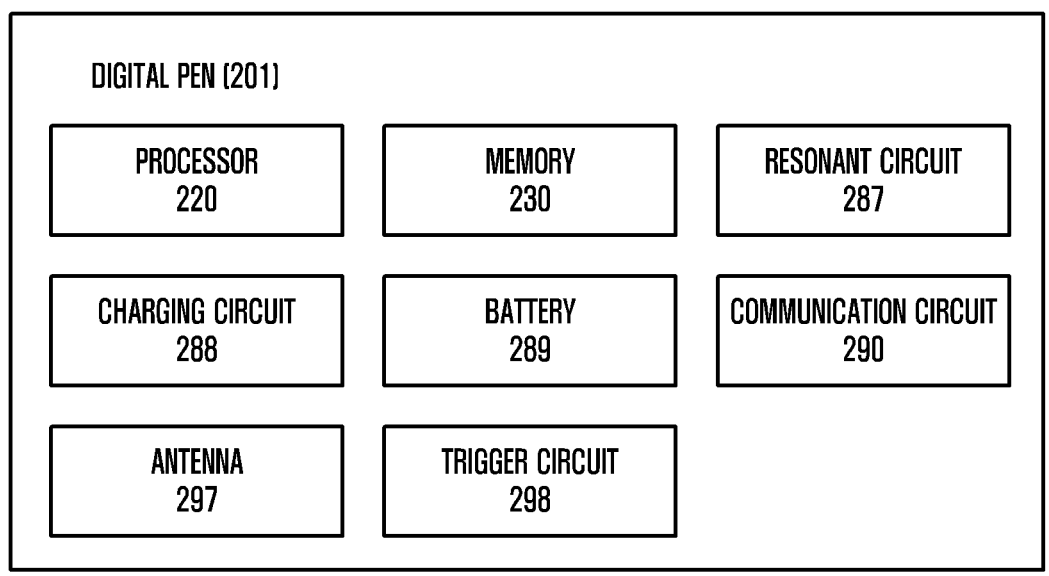
FIG. 2B is a block diagram illustrating a digital pen according to an embodiment.

FIG. 2B is a block diagram illustrating a digital pen according to an embodiment.

Referring to FIG. 2B, the digital pen 201 according to the embodiment may include a processor 220, a memory 230, a resonant circuit 287, a charging circuit 288, a battery 289, a communication circuit 290, an antenna 297, and/or a trigger circuit 298. In some embodiments, the processor 220, at least part of the resonant circuit 287, and/or at least part of the communication circuit 290 of the digital pen 201 may be configured on a printed circuit board or in the form of a chip. The processor 220, the resonant circuit 287, and/or the communication circuit 290 may be electrically connected to the memory 230, the charging circuit 288, the battery 289, the antenna 297, or the trigger circuit 298. According to an embodiment, the digital pen 201 may be configured with only a resonant circuit and a button.

The processor 220 may include a generic processor configured to execute a customized hardware module or software (e.g., an application program). The processor 220 may include a hardware component (function) or a software component (program) including at least one of various sensors included in the digital pen 201, a data measurement module, an input/output interface, a module managing a state or an environment of the digital pen 201, or a communication module. The processor 220 may include, for example, one or a combination of two or more of hardware, software, or firmware. According to an embodiment, the processor 220 may receive a proximity signal corresponding to an electromagnetic field signal generated from a digitizer of the electronic device 101 through the resonant circuit 287. When the proximity signal is identified, the processor 220 may control the resonant circuit 287 to transmit an electromagnetic resonance (EMR) input signal to the electronic device 101.

The memory 230 may store information related to an operation of the digital pen 201. For example, the information may include information for communication with the electronic device 101 and frequency information related to an input operation of the digital pen 201.

The resonant circuit 287 may include at least one of a coil, an inductor, and a capacitor. The resonant circuit 287 may be used for the digital pen 201 to generate a signal including a resonant frequency. For example, to generate a signal, the digital pen 201 may use at least one of an electromagnetic resonance (EMR) method, an active electrostatic (AES) method, or an electrically coupled resonance (ECR) method. When the digital pen 201 transmits a signal using the EMR method, the digital pen 201 may generate a signal including a resonant frequency, based on an electromagnetic field generated from an inductive panel of the electronic device 101. When the digital pen 201 transmits a signal using the AES method, the digital pen 201 may generate a signal using capacitive coupling with the electronic device 101. When the digital pen 201 transmits a signal using the ECR method, the digital pen 201 may generate a signal including a resonant frequency, based on an electric field generated from a capacitive device of the electronic device 101. According to an embodiment, the resonant circuit 287 may be used to change the strength or frequency of an electromagnetic field according to a manipulation state of a user. For example, the resonant circuit 287 may provide a frequency for recognizing a hovering input, a drawing input, a button input, or an erasing input.

When connected to the resonant circuit 287, based on a switching circuit, the charging circuit 288 may rectify a resonant signal generated by the resonant circuit 287 into a DC signal, and may provide the DC signal to the battery 289. According to an embodiment, the digital pen 201 may determine whether the digital pen 201 is inserted into the electronic device 101 by using the voltage level of a DC signal detected by the charging circuit 288.

The battery 289 may be configured to store power required for the operation of the digital pen 201. The battery 289 may include, for example, a lithium-ion battery or a capacitor, and may be rechargeable or replaceable. According to an embodiment, the battery 289 may be charged using power (e.g., a DC signal (DC power)) provided from the charging circuit 288.

The communication circuit 290 may be configured to perform a wireless communication function between the digital pen 201 and the communication module 190 of the electronic device 101. According to an embodiment, the communication circuit 290 may transmit state information and input information of the digital pen 201 to the electronic device 101 by using a short-distance communication method. For example, the communication circuit 290 may transmit direction information (e.g., motion sensor data) of the digital pen 201 obtained through the trigger circuit 298, voice information input through a microphone, or information about the remaining level of the battery 289 to the electronic device 101. The short-range communication method may include, for example, at least one of Bluetooth, Bluetooth Low Energy (BLE), or wireless LAN.

The antenna 297 may be used to transmit or receive a signal or power to the outside (e.g., the electronic device 101) or from the outside. According to an embodiment, the digital pen 201 may include a plurality of antennas 297, among which at least one antenna 297 suitable for a communication method may be selected among the plurality of antennas. The communication circuit 290 may exchange a signal or power with an external electronic device through the selected at least one antenna 297.

The trigger circuit 298 may include at least one button or sensor circuit. According to an embodiment, the processor 220 may identify the input method (e.g., touch or press) or type (e.g., EMR button or BLE button) of the button of the digital pen 201. According to an embodiment, the sensor circuit may generate an electrical signal or data value corresponding to an internal operating state or an external environmental state of the digital pen 201. For example, the sensor circuit may include at least one of a motion sensor, a battery level sensor, a pressure sensor, an optical sensor, a temperature sensor, a geomagnetic sensor, and a biometric sensor. According to an embodiment, the trigger circuit 298 may transmit a trigger signal to the electronic device 101 by using an input signal of the button or a signal through a sensor.

Figure 3:
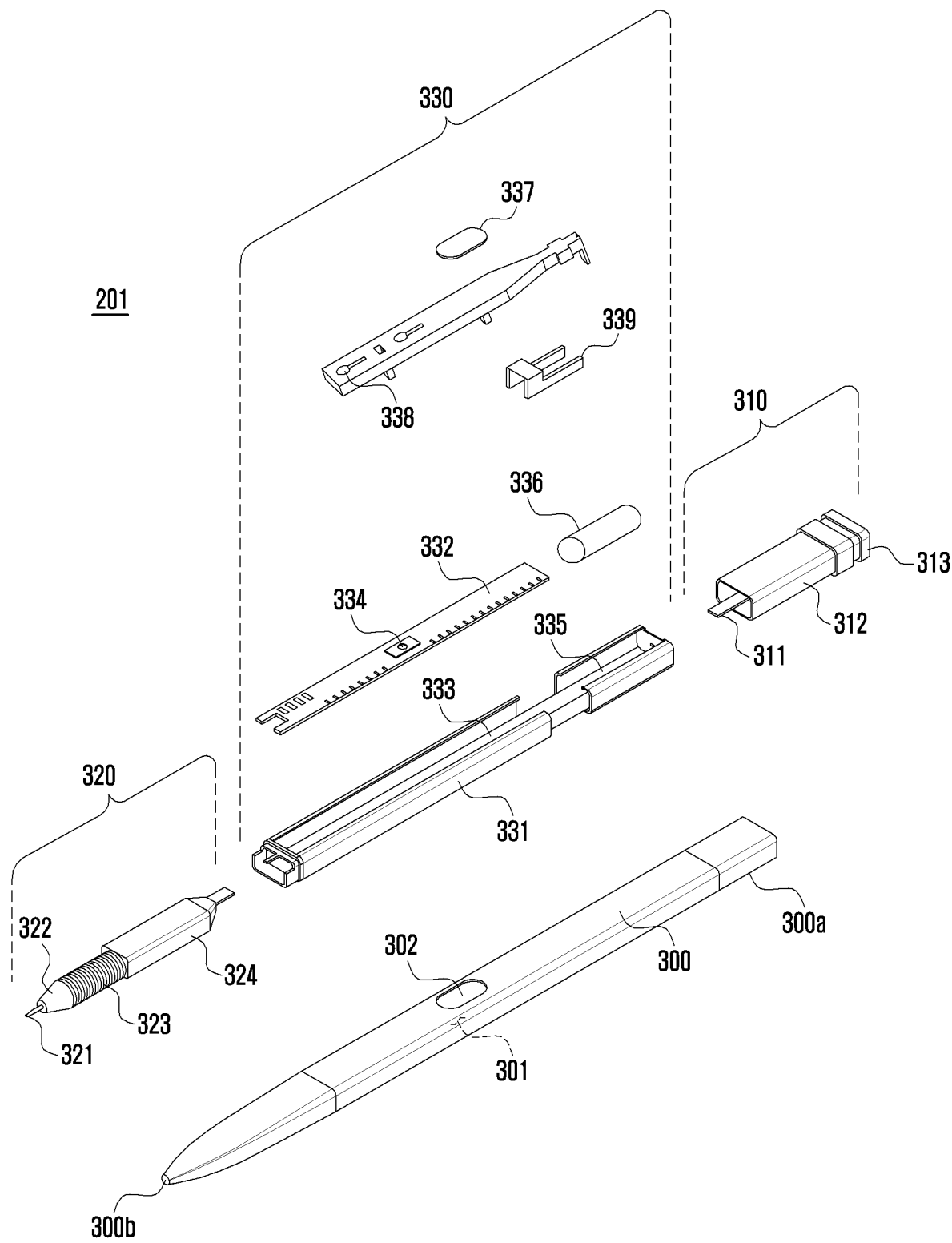
FIG. 3 is an exploded perspective view of a digital pen according to an embodiment.

FIG. 3 is an exploded perspective view of a digital pen according to an embodiment.

Referring to FIG. 3, the digital pen (e.g., the digital pen 201 of FIG. 2A) may include a pen housing 300 forming an outward appearance of the digital pen 201 and an inner assembly in the pen housing 300. In the illustrated embodiment, the inner assembly may include all various components mounted in the pen, and may be inserted into the pen housing 300 by a single assembly operation.

The pen housing 300 may have a shape extending lengthwise between a first end portion 300a and a second end portion 300b, and may include a storage space 301 inside. The pen housing 300 may have an elliptical cross-section including a major axis and a minor axis, and may be formed in an elliptical column shape as a whole. A storage space 112 of an electronic device (e.g., the electronic device 101 of FIG. 1) may also have an elliptical cross-section corresponding to the shape of the pen housing 300. The pen housing 300 may include a synthetic resin (e.g., plastic) and/or a metallic material (e.g., aluminum). According to an embodiment, the second end portion 300b of the pen housing 300 may include a synthetic resin material.

The inner assembly may have a shape extending lengthwise corresponding to the shape of the pen housing 300. The inner assembly may be largely divided into three components along a longitudinal direction. For example, the inner assembly may include an ejection member 310 disposed at a position corresponding to the first end portion 300a of the pen housing 300, a coil unit 320 disposed at a position corresponding to the second end portion 300b of the pen housing 300, and a circuit board unit 330 disposed at a position corresponding to a body of the housing.

The ejection member 310 may include a component for drawing the digital pen 201 from the storage space 112 of the electronic device 101. According to an embodiment, the ejection member 310 may include a shaft 311, an ejection body 312 disposed around the shaft 311 and forming an overall appearance of the ejection member 310, and a button unit 313. When the inner assembly is completely inserted into the pen housing 300, a portion including the shaft 311 and the ejection body 312 may be surrounded by the first end portion 300a of the pen housing 300, and the button unit 313 (e.g., 201a of FIG. 2A) may be exposed to the outside of the first end portion 300a. A plurality of components not shown, for example, cam members or elastic members, may be disposed in the ejection body 312 to form a push-pull structure. In an embodiment, the button unit 313 may be substantially coupled to the shaft 311 to perform a linear reciprocating motion with respect to the ejection body 312. According to various embodiments, the button unit 313 may include a button having a hooking structure so that a user may draw the digital pen 201 using a fingernail. According to an embodiment, the digital pen 201 may include a sensor to detect the linear reciprocating motion of the shaft 311, thereby providing another input method.

The coil unit 320 may include a pen tip 321 exposed to the outside of the second end portion 300b when the inner assembly is completely inserted into the pen housing 300, a packing ring 322, a coil 323 wound a plurality of times, and/or a pen pressure sensing unit 324 for obtaining a change in pressure according to pressurization of the pen tip 321. The packing ring 322 may include epoxy, rubber, urethane, or silicone. The packing ring 322 may be provided for waterproofing and dust proofing, and may protect the coil unit 320 and the circuit board unit 330 from water infiltration or dust. According to an embodiment, the coil 323 may form a resonant frequency in a configured frequency band (e.g., about 500 kHz), and may be combined with at least one element (e.g., a capacitor) to adjust the resonant frequency formed by the coil 323 in a certain range.

The circuit board unit 330 may include a printed circuit board 332, a base 331 surrounding at least one side of the printed circuit board 332, and an antenna (e.g., antenna 297). According to an embodiment, a substrate seating unit 333 on which the printed circuit board 332 is disposed may be formed on an upper side of the base 331, and the printed circuit board 332 may be fixed in a state of being seated on the substrate seating unit 333. According to an embodiment, the printed circuit board 332 may include an upper side and a lower side, a variable capacitance capacitor connected to the coil 323 or a switch 334 may be disposed on the upper side, and a charging circuit (e.g., charging circuit 288), a battery (e.g., battery 289), or a communication circuit (e.g., communication circuit 290) may be disposed on the lower side. The battery may include an electric double layer capacitor (EDLC). The charging circuit may be disposed between the coil 323 and the battery, and may include voltage detector circuitry and a rectifier.

The antenna may include an antenna structure 339, such as an example shown in FIG. 3, and/or an antenna embedded in the printed circuit board 332. According to various embodiments, the switch 334 may be disposed on the printed circuit board 332. A side button 337 provided in the digital pen 201 may be used to press the switch 334, and may be exposed to the outside through a side opening 302 of the pen housing 300. While being supported by a support member 338, the side button 337 may be restored to or maintained in a state of being disposed at a predetermined position by the support member 338 providing an elastic restoring force.

The circuit board unit 330 may include another packing ring, such as an O-ring. For example, O-rings made of an elastic material may be disposed at both ends of the base 331 to form a sealing structure between the base 331 and the pen housing 300. In an embodiment, the support member 338 may partially adhere to an inner wall of the pen housing 300 around the side opening 302 to form a sealing structure. For example, the circuit board unit 330 may also form a waterproof and dustproof structure similar to the packing ring 322 of the coil unit 320.

The digital pen 201 may include a battery seating unit 335 on which the battery 336 is disposed on the upper side of the base 331. The battery 336 that may be mounted on the battery seating unit 335 may include, for example, a cylinder-type battery. The battery 336 is an example of battery 289 of FIG. 2B.

The digital pen 201 may include a microphone (not shown). The microphone may be directly connected to the printed circuit board 332 or may be connected to a separate flexible printed circuit board (FPCB) (not shown) connected to the printed circuit board 332. According to various embodiments, the microphone may be disposed in a position parallel to the side button 337 in a lengthwise direction of the digital pen 201.

Figure 4:
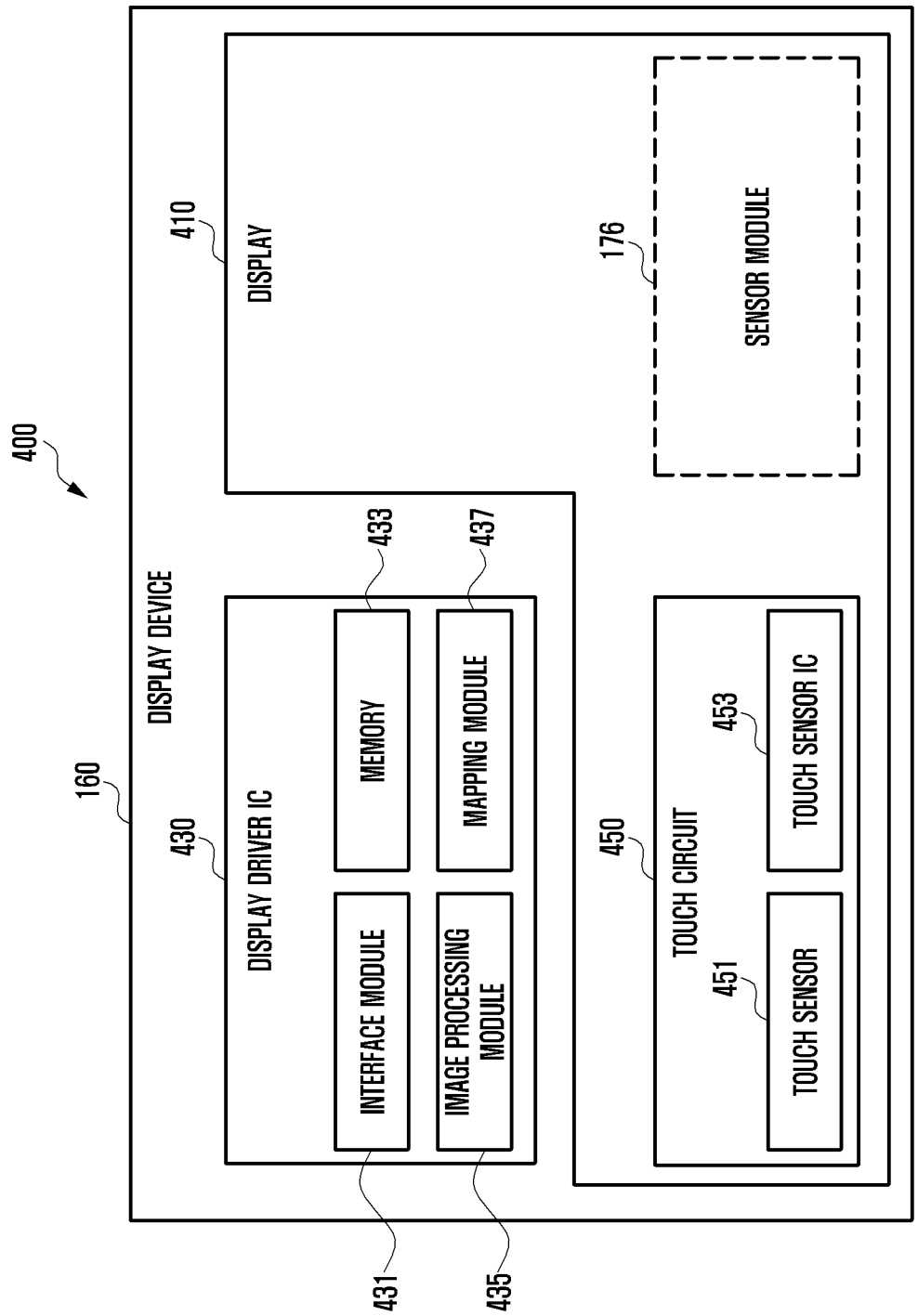
FIG. 4 is a block diagram 400 of a display device 160 according to various embodiments.

FIG. 4 is a block diagram 400 of a display device 160 according to various embodiments.

Referring to FIG. 4, the display device 160 may include a display 410 and a display driver IC (DDI) 430 to control the display 410. The DDI 430 may include an interface module 431, a memory 433 (e.g., a buffer memory), an image processing module 435, or a mapping module 437. The DDI 430 may receive, for example, image data or image information including an image control signal corresponding to a command to control the image data from another component of an electronic device 101 through the interface module 431. For example, according to an embodiment, the image information may be received from a processor 120 (e.g., a main processor 121 (e.g., an application processor) or a coprocessor 123 (e.g., a graphic processing unit) operating independently of a function of the main processor 121). The DDI 430 may communicate with a touch circuit 450 or a sensor module 176 through the interface module 431. Further, the DDI 430 may store at least some of the received image information, for example, in frames, in the memory 433. The image processing module 435 may perform preprocessing or postprocessing (e.g., resolution, brightness, or size adjustment), for example, on at least some of the image data, at least based on a characteristic of the image data or a characteristic of the display 410. The mapping module 437 may generate a voltage value or a current value corresponding to the image data preprocessed or postprocessed by the image processing module 135. According to an embodiment, the voltage value or the current value may be generated, for example, at least partly based on properties of pixels of the display 410 (e.g., an arrangement of pixels (RGB stripe or pentile structure) or the sizes of respective subpixels). At least some pixels of the display 410 may be driven, for example, at least partly based on the voltage value or the current value, thereby displaying visual information (e.g., text, an image, or an icon) corresponding to the image data on the display 410.

According to an embodiment, the display device 160 may further include the touch circuit 450. The touch circuit 450 may include a touch sensor 451 and a touch sensor IC 453 to control the touch sensor 451. The touch sensor IC 453 may control the touch sensor 451 to detect, for example, a touch input or a hovering input at a specific position of the display 410. For example, the touch sensor IC 453 may measure a change in signal (e.g., voltage, amount of light, resistance, or amount of electric charge) at the specific position of the display 410, thereby detecting the touch input or the hovering input. The touch sensor IC 453 may provide information (e.g., position, area, pressure, or time) about the detected touch input or hovering input to the processor 120. According to an embodiment, at least a part (e.g., the touch sensor IC 453) of the touch circuit 450 may be included as a part of the display driver IC 430 or the display 410, or as a part of a different component (e.g., the coprocessor 123) disposed outside the display device 160.

According to an embodiment, the display device 160 may further include an inductive panel (not shown). The inductive panel may be included in the display device 160 to detect an input using the digital pen 201 or hovering about the input. The inductive panel may induce the digital pen 201 to generate a signal including a resonant frequency. When the electronic device 101 is a foldable electronic device, the inductive panel may not be disposed in a hinge area.

According to an embodiment, the display device 160 may further include at least one sensor (e.g., a fingerprint sensor, an iris sensor, a pressure sensor, or an illuminance sensor) of the sensor module 176 or a control circuit therefor. In this case, the at least one sensor or the control circuit therefor may be embedded in a part (e.g., the display 410 or the DDI 430) of the display device 160 or a part of the touch circuit 450. For example, when the sensor module 176 embedded in the display device 160 includes a biometric sensor (e.g., a fingerprint sensor), the biometric sensor may obtain biometric information (e.g., a fingerprint image) related to a touch input through a partial area of the display 410. In another example, when the sensor module 176 embedded in the display device 160 includes a pressure sensor, the pressure sensor may obtain pressure information related to a touch input through a partial area or the entire area of the display 410. According to an embodiment, the touch sensor 451 or the sensor module 176 may be disposed between the pixels of a pixel layer of the display 410, or above or below the pixel layer.

An electronic device described below may be, for example, a foldable electronic device, and a display may also be foldable. A folding direction (e.g., up, down, left, right, inward, and outward), the degree of folding, and a folding position are not limited in the disclosure. When an input using a pen is received in a hinge area that is a folding area of the display, the electronic device may correct the input to reduce an error in the input using the pen. Hovering about the input (or hovering) may be hovering by a hand holding the pen.

Although the following description is made with reference to a foldable electronic device, the disclosure may also be applied to a rollable electronic device. For example, a rolled area of the rollable electronic device may correspond to a hinge area of the foldable electronic device.

FIG. 5 is a flowchart 500 of an electronic device correcting an input using a digital pen received in a hinge area according to various embodiments of the disclosure.

Referring to FIG. 5, in operation 510, the electronic device (e.g., the electronic device 101 of FIG. 1) may detect a movement (or motion) of an input using the digital pen (e.g., the digital pen 201 of FIG. 2A) on a display (e.g., the display device 160 of FIG. 4). The display 160 may include a touch sensor (e.g., the touch sensor 451 of FIG. 4) to detect the input using the digital pen or/and hovering about the input. The touch sensor 451 may transmit information (e.g., position, area, pressure, or time) about the detected input using the digital pen or/and hovering about the input to a processor 120.

According to various embodiments, in operation 520, the electronic device 101 may determine whether the movement of the input using the digital pen 201 occurs in a hinge area of the display. Here, the hinge area may be an area in which the display is foldable. According to an embodiment, the electronic device 101 may determine whether the movement of the input using the digital pen 201 occurs in the hinge area of the display by using a physical coordinate of the display at which the input using the digital pen 201 is received. According to another embodiment, the electronic device 101 may determine whether the movement of the input using the digital pen 201 occurs in the hinge area of the display by using at least one of the pressure and the start coordinate of the input using the digital pen 201 periodically occurring and the speed, the acceleration, the angular speed, and the angular acceleration of the movement of the input using the digital pen 201. According to still another embodiment, the electronic device 101 may determine whether the movement of the input using the digital pen 201 occurs in the hinge area of the display by using at least one of the physical coordinate of the display at which the input using the digital pen 201 is received, the pressure and the start coordinate of the input using the digital pen 201 periodically occurring, and the speed, the acceleration, the angular speed, and the angular acceleration of the movement of the input using the digital pen 201.

According to various embodiments, in operation 530, when the movement of the input using the digital pen 201 is determined to occur in the hinge area of the display, the electronic device 101 may determine whether the input using the digital pen 201 requires correction. Even though the input using the digital pen 201 is received in the hinge area, when the value of the input using the digital pen 201 is constant, the same as an input using the digital pen 201 in a normal area, the input using the digital pen 201 may not require correction.

According to various embodiments, in operation 540, when the input using the digital pen 201 is determined to require correction, the electronic device 101 may identify the intensity of the input using the digital pen 201 (e.g., the pressure of the input using the digital pen 201).

According to various embodiments, in operation 550, the electronic device 101 may further identify a position where the input using the digital pen 201 and the hovering about the input have occurred. The position of the input using the digital pen 201 may be the position of a point where pressure by the input using the digital pen 201 has occurred. Occurrence of the hovering about the input may be detected at a plurality of points. The electronic device 101 may identify some or all of positions where the hovering about the input has occurred.

According to various embodiments, in operation 560, the electronic device 101 may correct a coordinate of the input using the digital pen 201 by using the coordinate of the input using the digital pen 201 of which the intensity is identified and a coordinate of the position where the hovering about the input has occurred. The electronic device 101 may use a machine learning model to correct the coordinate of the input using the digital pen 201. The machine learning model used by the electronic device 101 to correct the coordinate of the input using the digital pen 201 will be described in detail with reference to FIG. 13. The electronic device 101 may enter at least some of the coordinate of the received input using the digital pen 201, the pressure of the received input using the digital pen 201, the coordinate of the position where the hovering about the input has occurred, and the intensity of the hovering about the input into the machine learning model, thereby obtaining the corrected coordinate of the input using the digital pen 201.

Although the electronic device 101 has been described as performing each operation, the processor (e.g., the processor 120 of FIG. 1) included in the electronic device 101 may perform each operation.

FIG. 6A to FIG. 6D illustrate a hinge area of a display in various types of foldable electronic devices.

Figure 6A:
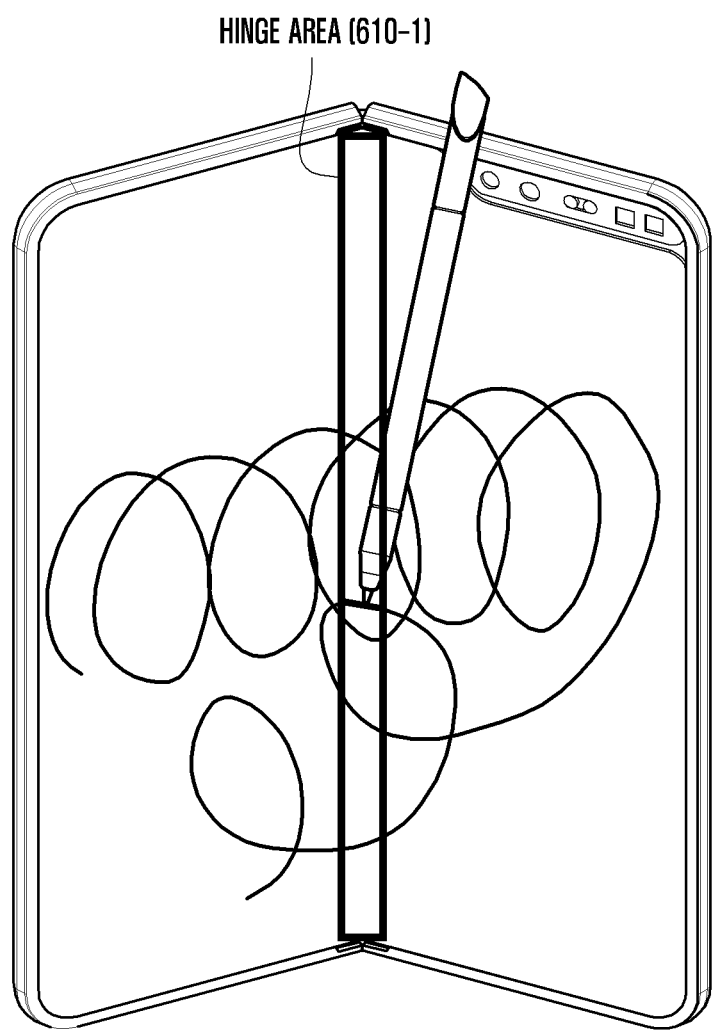
FIG. 6A to FIG. 6D illustrate a hinge area of a display in various types of foldable electronic devices.
Figure 6B:
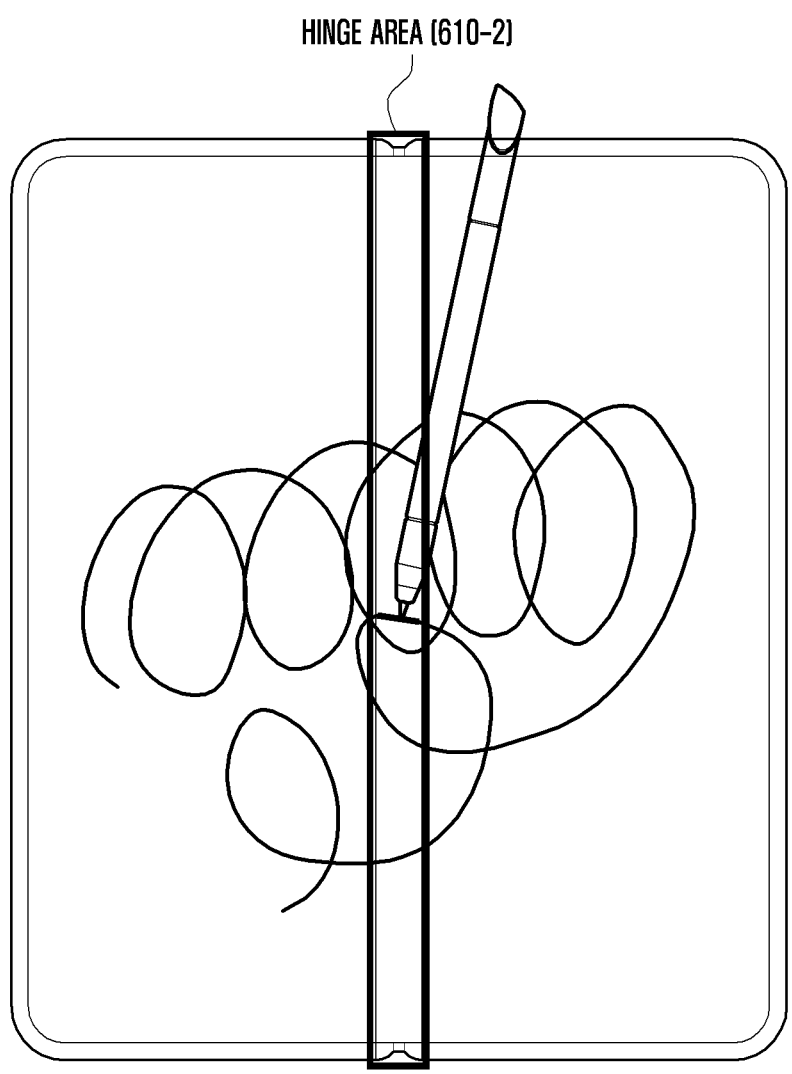
Figure 6C:
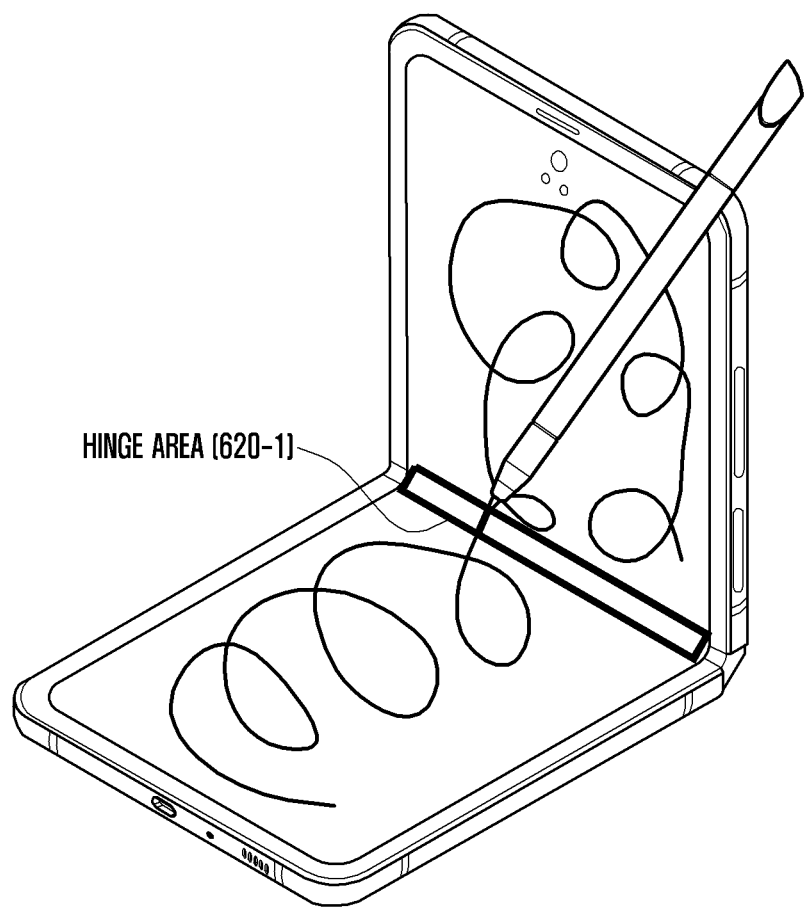
Figure 6D:
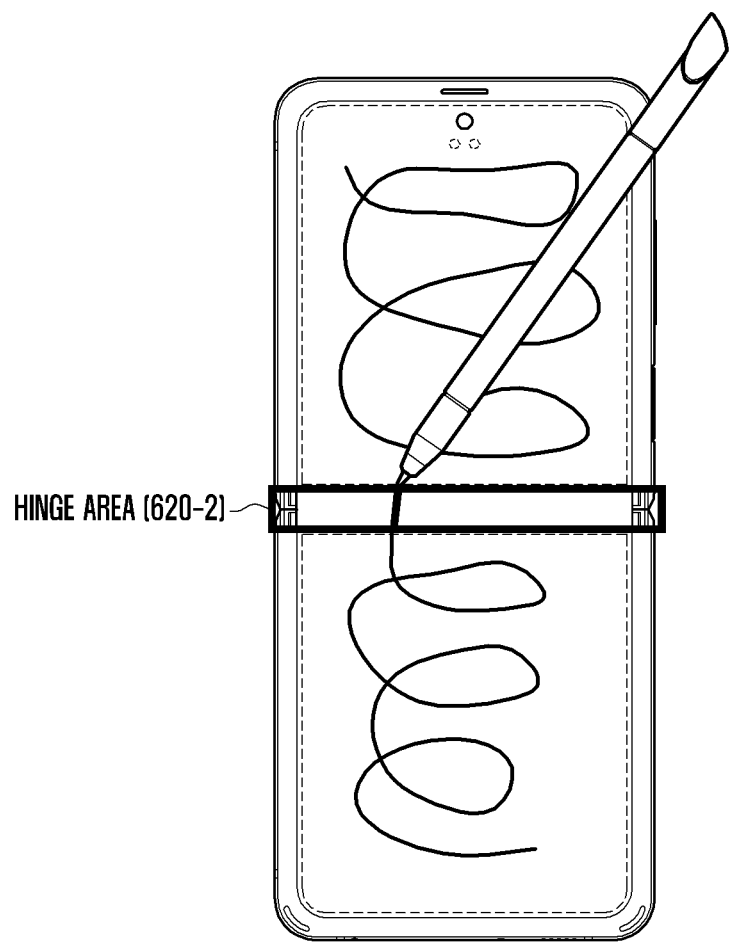

According to an embodiment, various types of foldable electronic devices (e.g., the electronic device 101 of FIG. 1) may be classified into an electronic device that is foldable left and right about a vertical axis as shown in FIG. 6A and FIG. 6B and an electronic device that is foldable up and down about a horizontal axis as shown in and FIG. 6C and FIG. 6D. In the foldable electronic devices 101, a display as well as a housing may be folded, and thus portions of the housing and the display may be hinge areas.

Referring to FIG. 6A and FIG. 6B, in the electronic device that is foldable left and right, a hinge area 610-1 and 610-2 of a display may be a long rectangular area. Referring to FIG. 6C and FIG. 6D, in the electronic device that is foldable up and down, a hinge area 620-1 and 620-2 of a display may be a long rectangular area.

According to an embodiment, the hinge areas 610-1, 610-2, 620-1, and 620-2 may have different physical curvature from that of an area (hereinafter, normal area) other than the hinge area. The hinge areas 610-1, 610-2, 620-1, and 620-2 may also have a different shape from that of the normal area. An input using a digital pen (e.g., the digital pen 201 of FIG. 2A) in the hinge areas may be detected differently depending on the degree to which the display is folded. According to an embodiment, since an inductive panel to detect the input using the digital pen 201 is not disposed in the hinge areas, the electronic device may detect the input using the digital pen 201 in the hinge areas 610-1, 610-2, 620-1, and 620-2 differently from an input using the digital pen 201 in the area other than the hinge areas. In a state in which the display is folded, the input using the digital pen 201 in the hinge areas may be detected differently depending on the position of the input. Since the hinge areas 610-1, 610-2, 620-1, and 620-2 may be different from the normal area, when the input using the digital pen 201 in the hinge areas is processed the same as the input using the digital pen 201 in the normal area, an input error may occur.

According to an embodiment, the electronic device 101 may use a physical coordinate value of the display to determine whether a received input using the digital pen 201 occurs in a hinge area.

According to an embodiment, the electronic device 101 may use a machine learning model to determine whether a received input using the digital pen 201 occurs in a hinge area. The machine learning model may be trained using at least some of the pressure, orientation, speed, acceleration, angular speed, and angular acceleration of an input using the digital pen 201 periodically occurring.

Figure 7:
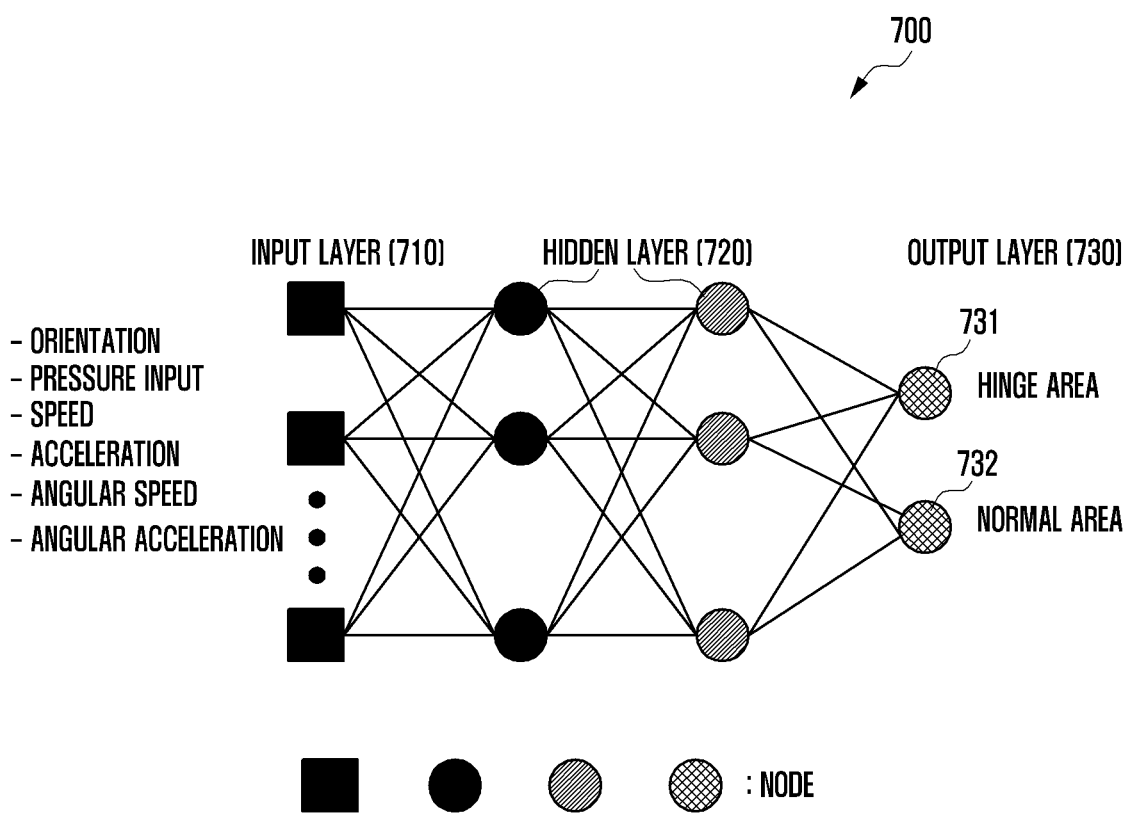
FIG. 7 illustrates an example of a machine learning model for determining whether the position of an input using a digital pen is a hinge area according to various embodiments.

FIG. 7 illustrates an example of a machine learning model for determining whether the position of an input using a digital pen is a hinge area according to various embodiments.

Referring to FIG. 7, the machine learning model 700 may include an input layer 710, a hidden layer 720, and an output layer 730. The input layer 710 and the output layer 730 may each include one layer, and the hidden layer 720 may include at least one or more layers. Each layer may include a node, and the strength of a connection between nodes may be expressed as a weight. The weight may be a value changing by learning.

According to an embodiment, since an electronic device may use at least some of the pressure, orientation, speed, acceleration, angular speed, and angular acceleration of an input using a digital pen (e.g., the digital pen 201 of FIG. 2A) periodically occurring in order to determine whether the position of the input using the digital pen is a hinge area, at least some of the pressure, orientation, speed, acceleration, angular speed, and angular acceleration of the input using the digital pen 201 periodically occurring may be a node of the input layer 710.

According to an embodiment, the hidden layer 720 may include at least one or more layers. Each layer may include at least one node. The numbers of nodes included in the respective layers may or may not be the same. In the disclosure, the number of layers included in the hidden layer 720 and the number of nodes included in a layer may not be limited.

According to an embodiment, the output layer 730 may indicate a result that the electronic device intends to determine through the machine learning model. Since the electronic device uses the machine learning model to determine whether the position of the input using the digital pen 201 is the hinge area or a normal area, the output layer 730 of the machine learning model may include a node 731 indicating that the position of the input using the digital pen 201 is the hinge area and a node 732 indicating that the position of the input using the digital pen 201 is the normal area.

According to an embodiment, the electronic device may determine whether the input using the digital pen 201 has occurred in the hinge area by using the machine learning model 700 which has been completely trained. Whether the machine learning model 700 has been completely trained may be determined based on at least some of the number of training times, training time, and the number of pieces of training data.

Hereinafter, results of analyzing various data of an input using the digital pen 201 received in the hinge area and the normal area are shown. The various data of the input using the digital pen 201 may include, for example, a time interval at which the input using the digital pen 201 is received and the pressure, orientation (or coordinate of the orientation), speed, acceleration, angular speed, and angular acceleration of the input using the digital pen 201. For example, the time interval at which the input using the digital pen 201 is received may be determined by a speed at which the electronic device samples the input. When the speed at which the electronic device samples the input is about 120 Hz, one input may be received about every 8 ms.

According to an embodiment, when pieces of data of inputs using the digital pen 201 received in the hinge area and the normal area are different or a difference therebetween is out of a certain range, the pieces of data may be a node of the input layer of the machine learning model.

Table 1 shows times when inputs using the digital pen 201 are received in the hinge area and the normal area.

TABLE 1

| Index of input using digital pen 201 | Time when input using digital pen 201 is received | |
|---|---|---|
| | Normal area | Hinge area |
| 1 | 0 | 0 |
| 2 | 4 | 6 |
| 3 | 8 | 8 |
| 4 | 12 | 14 |
| 5 | 17 | 17 |
| 6 | 21 | 22 |
| 7 | 25 | 25 |
| 8 | 29 | 31 |
| 9 | 33 | 33 |
| 10 | 37 | 39 |
| 11 | 42 | 42 |
| 12 | 46 | 47 |
| 13 | 50 | 50 |
| 14 | 54 | 56 |
| 15 | 58 | 58 |
| 16 | 62 | 64 |
| 17 | 66 | 67 |
| 18 | 71 | 72 |
| 19 | 75 | 75 |
| 20 | 79 | 80 |
| 21 | 83 | 83 |
| 22 | 87 | 89 |
| 23 | 91 | 91 |
| 24 | 96 | 97 |
| 25 | 100 | 100 |

Referring to Table 1, time intervals at which the input using the digital pen 201 is received in the normal area are about 4 or 5 (ms), and a variance in the reception time interval is constant about 0.15, whereas time intervals at which the input using the digital pen 201 is received in the hinge area are about 2 to 6 (ms), and a variance in the reception time interval is about 2.38, which may be greater than the variance in the time intervals at which the input using the digital pen 201 is received in the normal area. That is, the time interval at which the input using the digital pen 201 is received in the normal area may be regular, whereas the time intervals at which the input using the digital pen 201 is received in the hinge area may be irregular.

Figure 8A:
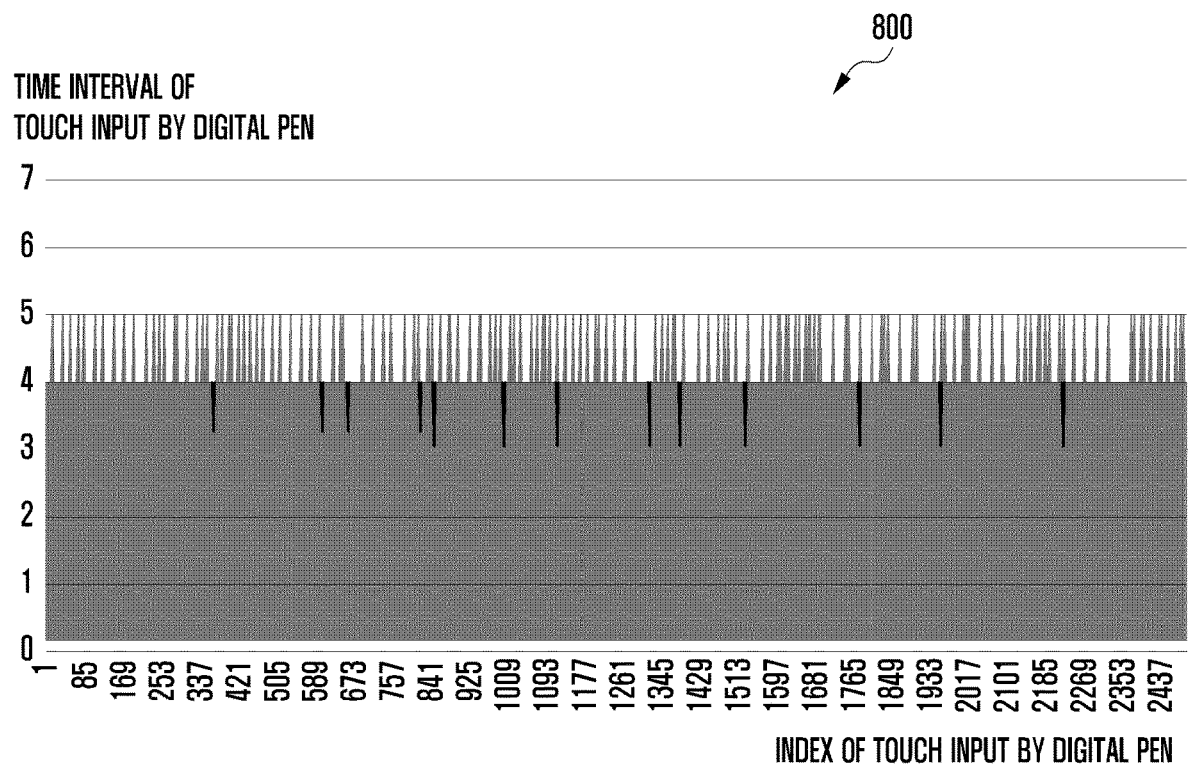
FIG. 8A and FIG. 8B are graphs illustrating a time interval of an input using a digital pen received in a normal area and a hinge area according to various embodiments.
Figure 8B:
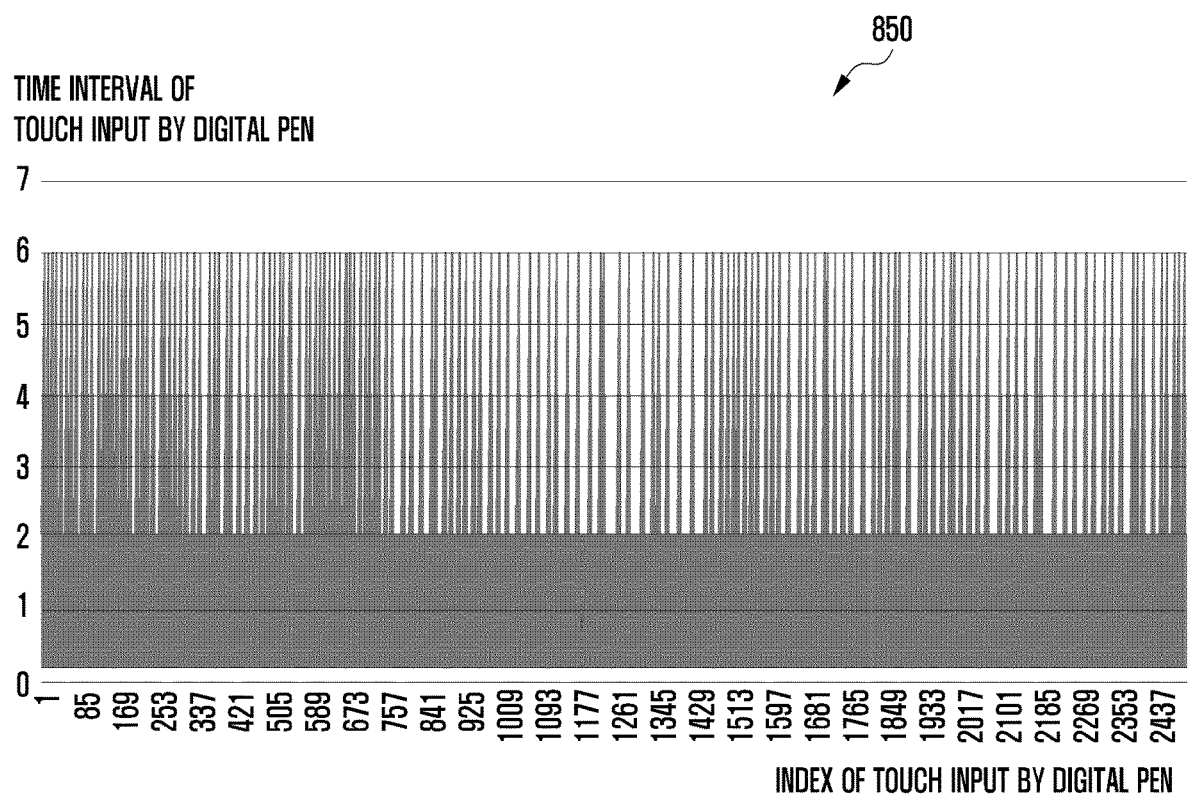

FIG. 8A and FIG. 8B are graphs 800 and 850 illustrating a time interval of an input using a digital pen received in a normal area and a hinge area according to various embodiments.

Referring to graph 800 of FIG. 8A, time intervals of an input using the digital pen received in the normal area may be almost regular, while referring to graph 850 of FIG. 8B, time intervals of an input using the digital pen received in the hinge area may be more irregular than the time intervals of the input using the digital pen received in the normal area.

Figure 9:
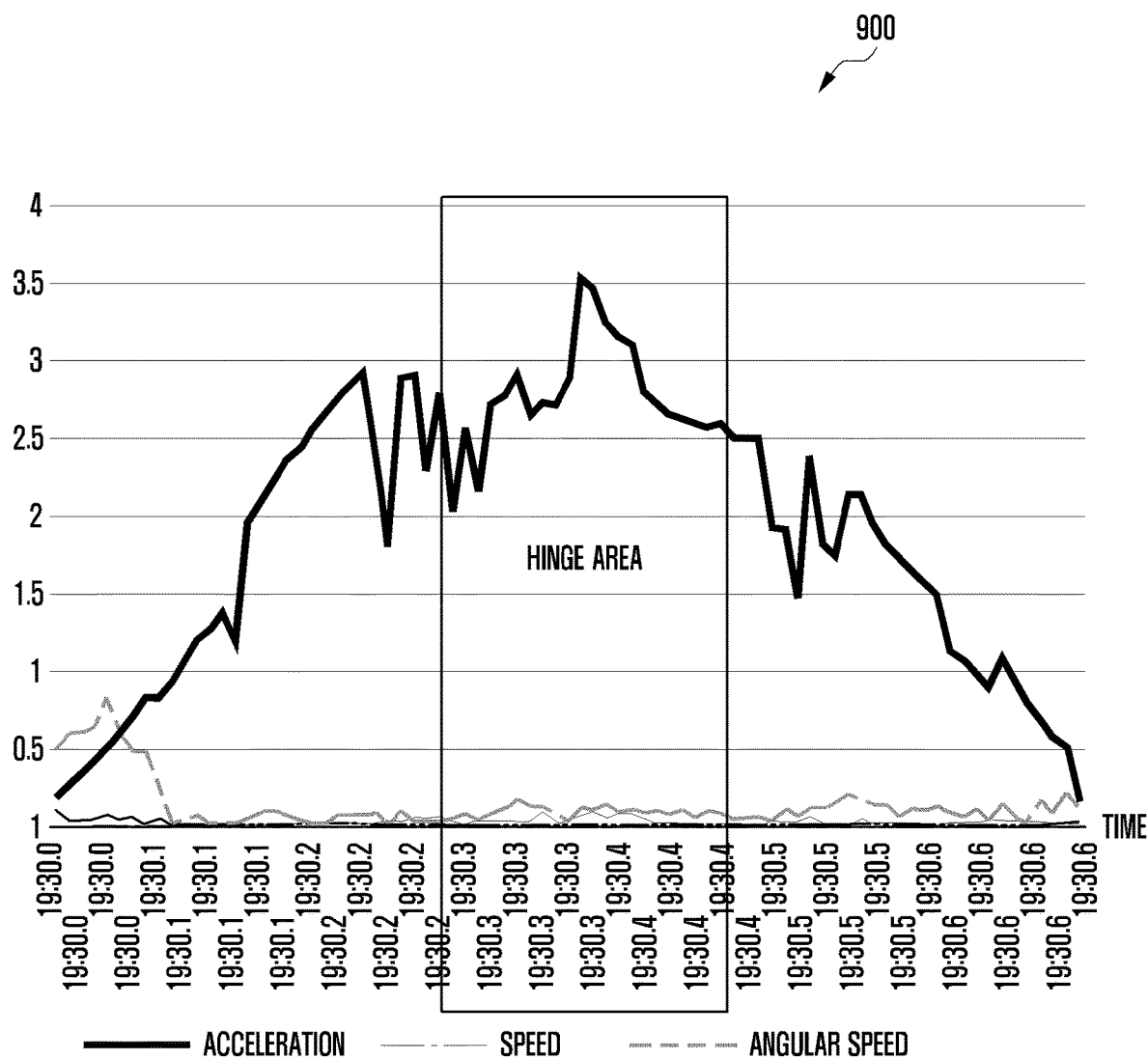
FIG. 9 is a graph illustrating the speed, acceleration, angular speed, and angular acceleration of an input using a digital pen received in a normal area and a hinge area according to various embodiments.

FIG. 9 is a graph 900 illustrating the speed, acceleration, angular speed, and angular acceleration of an input using a digital pen received in a normal area and a hinge area according to various embodiments.

Referring to graph 900 of FIG. 9, the angular speed and angular acceleration of an input using the digital pen is received in the hinge area may more significantly vary than those of an input received in the normal area. However, the speed and acceleration of the input using the digital pen is received in the hinge area may not significantly vary compared to those of the input received in the normal area.

Figure 10:
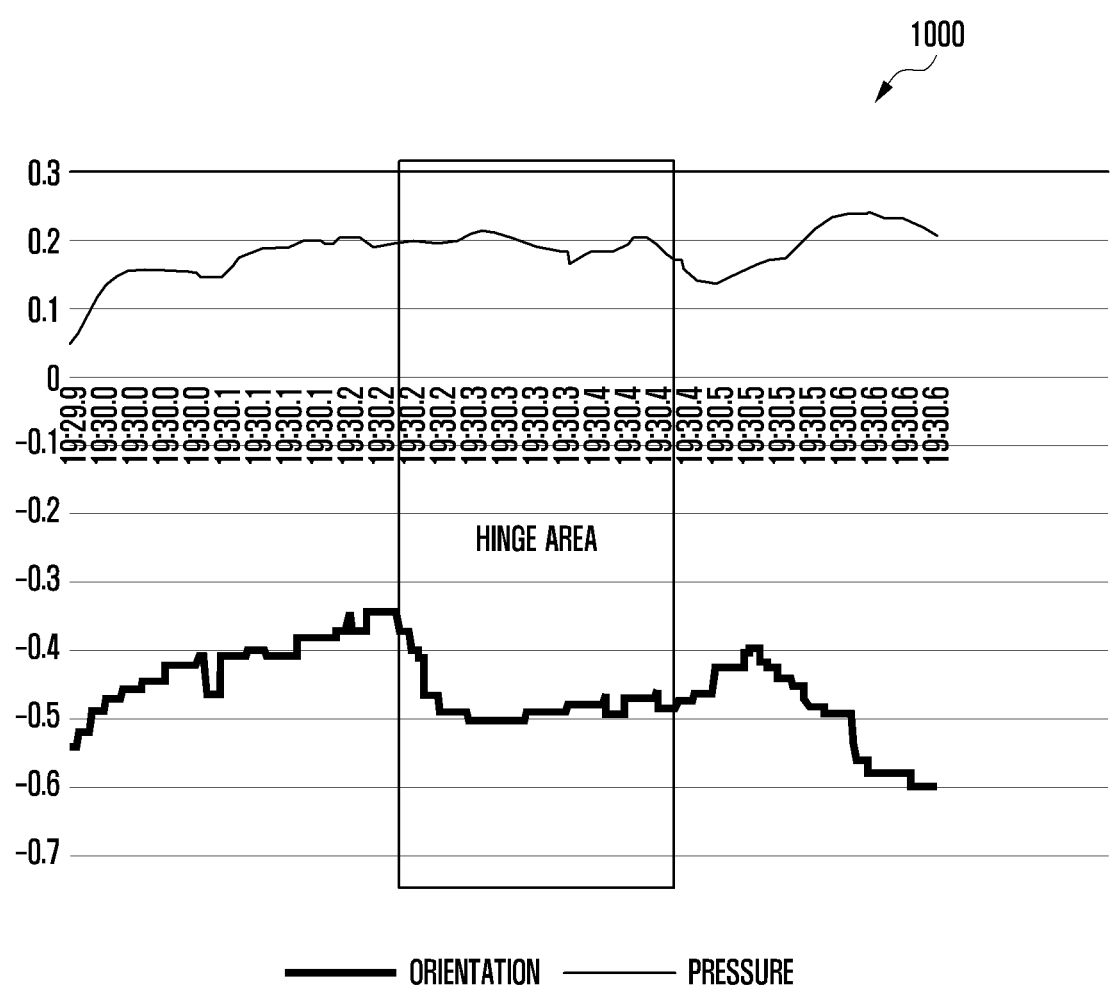
FIG. 10 is a graph illustrating the orientation and pressure of an input using a digital pen received in a normal area and a hinge area according to various embodiments.

FIG. 10 is a graph 1000 illustrating the orientation and pressure of an input using a digital pen received in a normal area and a hinge area according to various embodiments.

Referring to graph 1000 of FIG. 10, the orientation of an input using the digital pen may change in the hinge area. Since a display may not be physically flat in the hinge area, the orientation may be changed instantaneously, and the range of a change may be wide.

According to an embodiment, the pressure of the input using the digital pen may also not be constant because the hinge area of the display is not flat.

According to an embodiment, the display may include an inductive panel to receive the input using the digital pen. However, since the inductive panel may not be disposed in the hinge area, the orientation and pressure of the input using the digital pen in the hinge area may not be constant.

Figure 11A:
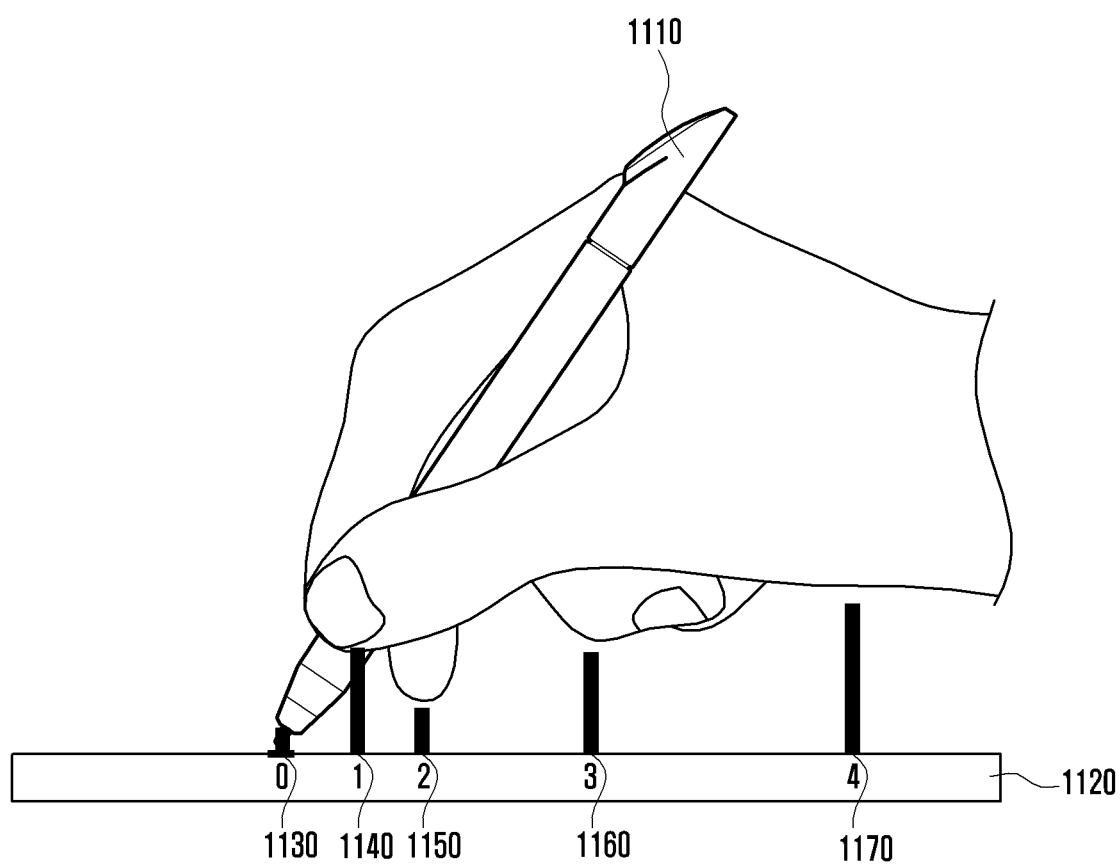
FIG. 11A illustrates an example in which an input using a digital pen by a user is received according to various embodiments.

FIG. 11A illustrates an example in which an input using a digital pen by a user is received according to various embodiments.

According to an embodiment, the user may perform an input on a display 1120 by using the digital pen (e.g., a digitizer pen) 1110 (e.g., the digital pen 201 of FIG. 2A). The user may input a desired item (e.g., a character or a button selection) on the display 1120 by moving the digital pen 1110 in a pressed state. This input may be referred to as tracking of an input using a digital pen. When the user presses the display 1120 using the digital pen 1110, pressure may be applied to the display 1120 by the digital pen 1110, and an electronic device (e.g., the electronic device 101 of FIG. 1) may recognize the pressure on the display 1120 using a sensor (not shown). The electronic device 101 may also obtain a coordinate of a position at point 1130 pressed by the digital pen 1110.

According to an embodiment, when the display 1120 is pressed by the digital pen 1110, the electronic device 101 may further determine whether hovering occurs by the user's hand holding the digital pen 1110. When hovering is determined to have occurred, the electronic device 101 may obtain a coordinate of a position where the hovering has occurred. Referring to FIG. 11A, when the display 1120 is pressed by the digital pen 1110, the electronic device 101 may determine that the hovering has occurred at a plurality of points 1140, 1150, 1160, and 1170 including a point 1130 pressed by the digital pen 1110. The electronic device 101 may obtain coordinates of the plurality of points 1140, 1150, 1160, and 1170 where the hovering has occurred and the intensity (or degree) of each point.

Figure 11B:
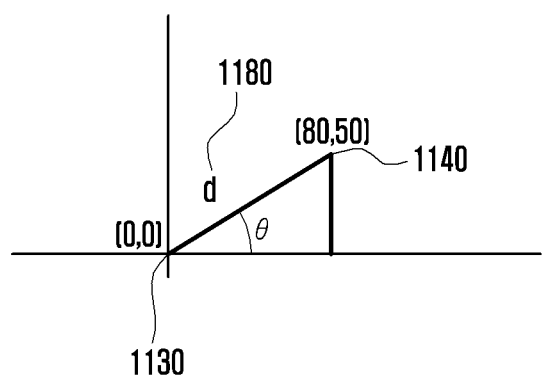
FIG. 11B is an example of obtaining a writing distance when an input using a digital pen by a user is received according to various embodiments.

FIG. 11B is an example of obtaining a writing distance when an input using a digital pen (e.g., digital pen 1110) by a user is received according to various embodiments.

Referring to FIG. 11B, the coordinate value of the point 1130 pressed by the digital pen in FIG. 11A may be assumed to be (0, 0). The electronic device 101 may obtain a coordinate of a point closest to the point 1130 pressed by the digital pen among the points where the hovering has occurred, and may obtain a writing distance (d) 1180.

According to an embodiment, the writing distance (d) may be maintained substantially fixed while the user holds the digital pen, and may thus be used as an input to the input layer during training.

According to an embodiment, since the user is not able to perform input to the display 1120 by always pressing the digital pen 1110 with the same pressure, the electronic device 101 may obtain the writing distance (d) 1180 using the point where the hovering has occurred, and may use the writing distance (d) 1180 to recognize writing using the digital pen 1110.

Figure 12A:
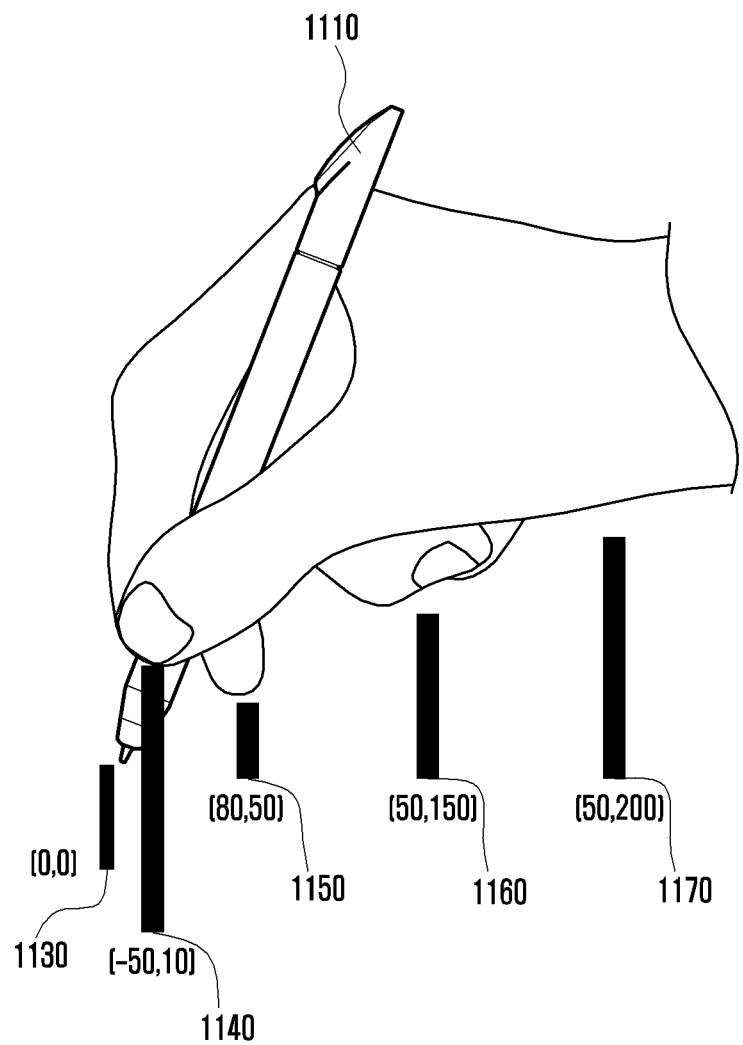
FIG. 12A illustrates an example of coordinates of a point where an input using a digital pen occurs and a point where hovering about the input occurs when the input using the digital pen is performed according to various embodiments.
Figure 12B:
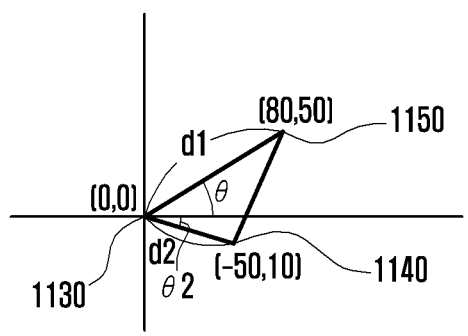
FIG. 12B illustrates an example of obtaining a writing distance using a plurality of points where hovering occurs according to various embodiments.

Although FIG. 11A and FIG. 11B show that only the coordinate of the point closest to the point 1130 pressed by the digital pen 1110 among the points where the hovering has occurred is used to obtain the writing distance (d) 1180, the writing distance (d) 1180 may be obtained using a plurality of points among the points where the hovering has occurred. FIG. 12A and FIG. 12B show an example of deriving a writing distance using a plurality of points among points where hovering has occurred.

FIG. 12A illustrates an example of coordinates of a point where an input using a digital pen occurs and a point where hovering about the input occurs when the input using the digital pen is performed according to various embodiments.

FIG. 12A shows coordinates of a point (e.g., 1130 in FIG. 11A) where an input using a digital pen 1110 occurs and points (e.g., 1140, 1150, 1160, and 1170 of FIG. 11A) where hovering about the input occurs when a user performs the input using the digital pen 1110 on a display as shown in FIG. 11A. The hovering may be determined to occur at a plurality of points. Assuming that the coordinates of the point where the input using the digital pen occurs is (0, 0), the coordinates of the points where the hovering about the input occurred may be (−50, 10), (80, 50), (50, 150), and (50, 200).

FIG. 12B illustrates an example of obtaining a writing distance using a plurality of points where hovering occurs according to various embodiments.

According to an embodiment, an electronic device (e.g., the electronic device 101 of FIG. 1) may continuously obtain a writing distance by using a plurality of points where hovering occurs and a point where an input using a digital pen (e.g., digital pen 1110) occurs. The electronic device 101 may continue to determine whether the input using the digital pen is received even through the pressure of the input using the digital pen is reduced. For example, when the pressure of the input using the digital pen is low, the electronic device 101 may obtain the writing distance by identifying the point where the hovering about the input occurs, and may determine that the input using the digital pen is received when the writing distance is within a certain range from the coordinates of the input using the digital pen.

Figure 13:
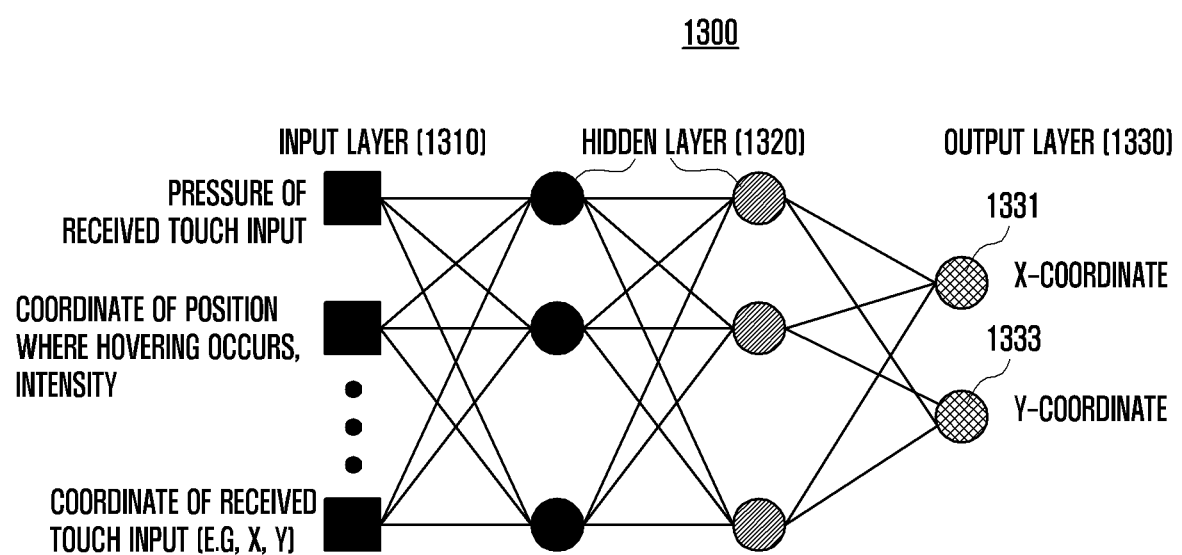
FIG. 13 illustrates an example of a machine learning model for correcting the position of an input using a digital pen received in a hinge area according to various embodiments.

FIG. 13 illustrates an example of a machine learning model for correcting the position of an input using a digital pen received in a hinge area according to various embodiments.

Referring to FIG. 13, the machine learning model 1300 may include an input layer 1310, a hidden layer 1320, and an output layer 1330. The input layer 1310 and the output layer 1330 may each include one layer, and the hidden layer 1320 may include at least one or more layers. Each layer may include a node, and the strength of a connection between nodes may be expressed as a weight. The weight may be a value changing by learning. The machine learning model 1300 of FIG. 13 may be a machine learning model similar to the machine learning model 700 of FIG. 7.

According to an embodiment, to correct the position of an input using a digital pen received in a hinge area, an electronic device may use a coordinate value (e.g., an X value and a Y value) of the received input using the digital pen and the pressure of the input using the digital pen. The electronic device may further use a determined coordinate value of the position of hovering and the intensity of the hovering to correct the position of the input using the digital pen received in the hinge area. At least some of the coordinate value of the input using the digital pen received in the hinge area, the pressure of the input, the coordinate value of the position of the hovering, and the intensity of the hovering may be a node of the input layer 1310 of the machine learning model.

According to an embodiment, the hidden layer 1320 may include at least one or more layers. Each layer may include at least one node. The numbers of nodes included in the respective layers may or may not be the same. In the disclosure, the number of layers included in the hidden layer 1320 and the number of nodes included in a layer may not be limited.

According to an embodiment, the output layer 1330 may indicate a result that the electronic device intends to determine through the machine learning model. Since the machine learning model 1300 of FIG. 13 is for obtaining the corrected position of the input using the digital pen, the output layer 1330 may include a node 1331 indicating a corrected x-coordinate of the input using the digital pen and a node 1332 indicating a corrected y-coordinate of the input using the digital pen.

Similar to the machine learning model 700 of FIG. 7, the electronic device may obtain the corrected position of the input using the digital pen using the machine learning model 1300 which has been completely trained. Whether the machine learning model 1300 has been completely trained may be determined based on at least some of the number of training times, training time, and the number of pieces of training data.

Figure 14:
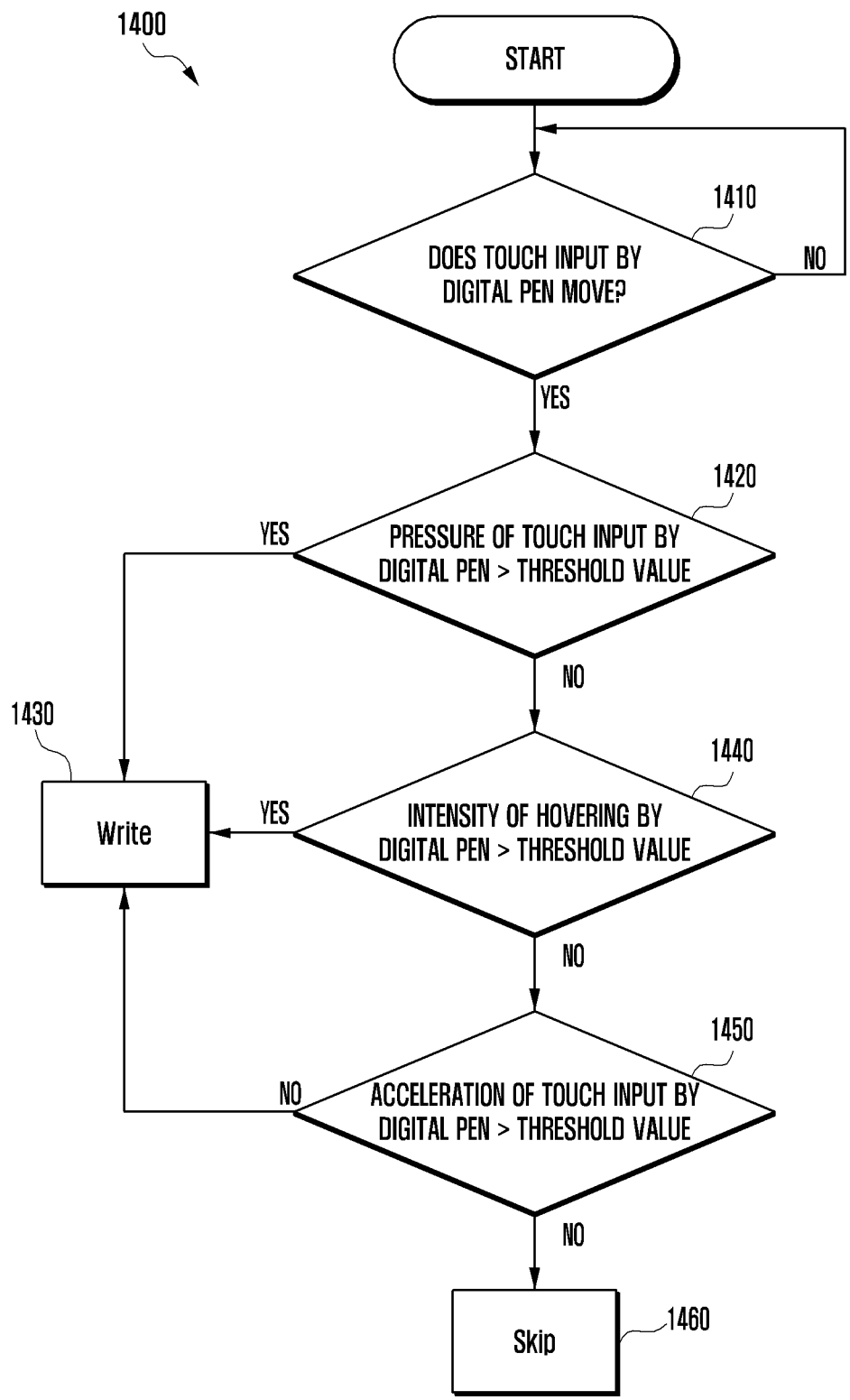
FIG. 14 is a flowchart of distinguishing skipping and writing of an input using a digital pen according to various embodiments.

FIG. 14 is a flowchart 1400 of distinguishing skipping and writing of an input using a digital pen according to various embodiments.

According to an embodiment, skipping may mean a section of moving from a stroke to a stroke, and writing may mean a section of writing a stroke.

Referring to the flowchart 1400 of FIG. 14, in operation 1410, an electronic device (e.g., the electronic device 101 of FIG. 1) may identify whether an input using a digital pen moves. The electronic device 101 may identify movement of the input using the digital pen to identify whether the input using the digital pen is skipping or writing.

According to an embodiment, when the input using the digital pen is identified as moving, the electronic device 101 may identify whether the pressure of the input using the digital pen is greater than a threshold value in operation 1420. The threshold value may be a pressure value of the input using the digital pen for identifying presence of the input using the digital pen.

According to an embodiment, when the pressure of the input using the digital pen is greater than the threshold value, the electronic device 101 may identify the input using the digital pen as writing in operation 1430.

According to an embodiment, when the pressure of the input using the digital pen is less than the threshold value, the electronic device 101 may identify whether the intensity of hovering is greater than a threshold value in operation 1440. When the pressure of the input using the digital pen is less than the threshold value, the electronic device 101 may further identify the intensity of the hovering to identify whether the writing is finished. Even though the input using the digital pen is writing, the pressure of the input using the digital pen may be weak momentarily or the pressure of the input using the digital pen may be weak because the input using the digital pen occurs in a hinge area. The electronic device 101 may identify the intensity of the hovering, thereby preventing erroneous recognition of the input using the digital pen.

According to an embodiment, when the intensity of the hovering is greater than the threshold value, the electronic device 101 may identify the input using the digital pen as writing in operation 1430.

According to an embodiment, when the intensity of the hovering is less than the threshold value, the electronic device 101 may identify whether the acceleration of the input using the digital pen is greater than a threshold value in operation 1450. Since the acceleration of the input using the digital pen is lower in skipping than in writing, the electronic device 101 may further identify the acceleration of the input using the digital pen.

According to an embodiment, when the acceleration of the input using the digital pen is greater than the threshold value, the electronic device 101 may identify the input using the digital pen as skipping in operation 1460.

According to an embodiment, when the acceleration of the input using the digital pen is less than the threshold value, the electronic device 101 may identify the input using the digital pen as writing in operation 1430.

According to an embodiment, the electronic device 101 may distinguish writing and skipping using a machine learning model using at least some of the pressure of an input using a digital pen, the intensity of hovering, and the acceleration of the input using the digital pen as input. The machine learning model for distinguishing writing and skipping may also be similar to the machine learning model 700 of FIG. 7 or the machine learning model 1300 of FIG. 13.

Figure 15A:
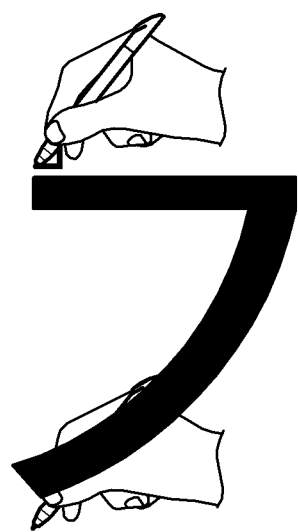
FIG. 15A to FIG. 15C illustrate examples of distinguishing writing and skipping according to various embodiments.
Figure 15B:
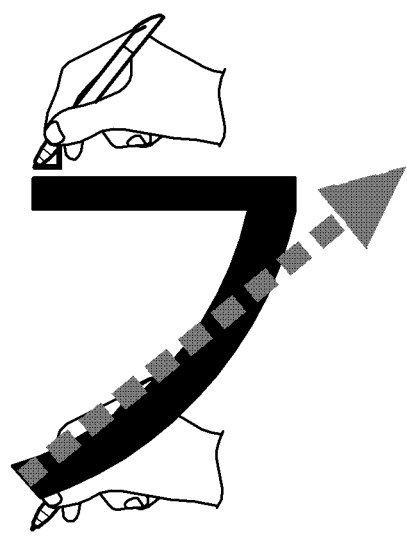
Figure 15C:
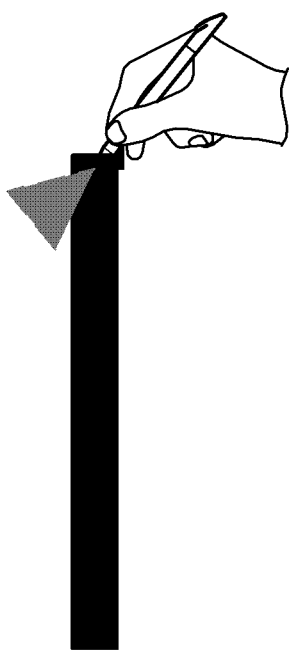

FIG. 15A to FIG. 15C illustrate examples of distinguishing writing and skipping according to various embodiments.

FIG. 15A to FIG. 15C illustrate a process of writing, for example, ""기" ]" on a display of an electronic device.

Referring to FIG. 15A, a user may write ""ㄱ"" with a digital pen kept on the display of the electronic device. Here, the pressure of an input using the digital pen may be 3, the intensity of hovering may be 4, and the acceleration may be 1 to 3.

Referring to FIG. 15B, the user may detach and move the digital pen over the display to write "]". When the digital pen is moved, the pressure of the input using the digital pen may be 0, the intensity of hovering may be 2, and the acceleration may be 4 to 5.

Referring to FIG. 15C, the user may then input "]" on the display of the electronic device using the digital pen. Here, the pressure of the input using the digital pen may be 3, the intensity of hovering may be 4, and the acceleration may be 1 to 3.

An electronic device according to various embodiments of the disclosure may include a display and a processor, where the processor may detect movement of an input using a digital pen on the display, may determine whether the movement of the input using the digital pen occurs in a hinge area of the display, may determine whether the input using the digital pen needs correcting, when it is determined that the movement occurs in the hinge area, may identify an intensity of the input using the digital pen when it is determined that the input using the digital pen needs correcting, may identify a position of the input using the digital pen and a position at which hovering about the input occurs, and may correct a coordinate of the input using the digital pen by using the coordinate of the input using the digital pen of which the intensity is identified and a coordinate of the position at which the hovering occurs.

The processor of the electronic device according to various embodiments of the disclosure may determine whether the movement occurs in the hinge area of the display using a physical coordinate of the display.

The processor of the electronic device according to various embodiments of the disclosure may periodically further determine whether the movement of the input using the digital pen occurs in the hinge area of the display by using at least one of a pressure and a start coordinate of the input using the digital pen and a speed, an acceleration, an angular speed, and an angular acceleration of the movement of the input using the digital pen.

The processor of the electronic device according to various embodiments of the disclosure may determine whether the movement of the input using the digital pen occurs in the hinge area of the display by using a machine learning model trained using at least some of the pressure and the start coordinate of the input using the digital pen and the speed, the acceleration, the angular speed, and the angular acceleration of the movement of the input using the digital pen.

In the electronic device according to various embodiments of the disclosure, the input using the digital pen and the hovering about the input may occur at a plurality of positions, and the processor may correct a coordinate of a touch input using the digital pen by using a coordinate of a position at which hovering closest to the input using the digital pen occurs.

In the electronic device according to various embodiments of the disclosure, a touch input using the digital pen and hovering about the input may occur at a plurality of positions, and the processor may correct the coordinate of the input using the digital pen by using a coordinate of some of the plurality of positions at which the hovering occurs.

The processor of the electronic device according to various embodiments of the disclosure may correct the coordinate of the input using the digital pen by using a machine learning model trained using the coordinate of the input using the digital pen of which the intensity is identified and the coordinate of the position at which the hovering occurs.

The processor of the electronic device according to various embodiments of the disclosure may recognize the input using the digital pen by an electromagnetic resonance (EMR) method.

The processor of the electronic device according to various embodiments of the disclosure may determine that the input using the digital pen does not need correcting when a pressure of the input using the digital pen is measured within a threshold value.

The processor of the electronic device according to various embodiments of the disclosure may identify whether an input coordinate prediction function of an executed application is activated, and may deactivate the input coordinate prediction function when the input coordinate prediction function is identified as being activated.

An operating method of an electronic device according to various embodiments of the disclosure may include detecting movement of an input using a digital pen on a display, determining whether the movement of the input using the digital pen occurs in a hinge area of the display, determining whether the input using the digital pen needs correcting, when it is determined that the movement occurs in the hinge area, identifying an intensity of the input using the digital pen when it is determined that the input using the digital pen needs correcting, identifying a position of the input using the digital pen and a position at which hovering about the input occurs, and correcting a coordinate of the input using the digital pen by using the coordinate of the input using the digital pen of which the intensity is identified and a coordinate of the position at which the hovering occurs.

In the operating method of the electronic device according to various embodiments of the disclosure, the determining whether the movement of the input using the digital pen occurs in the hinge area of the display may include determining whether the movement occurs in the hinge area of the display using a physical coordinate of the display.

In the operating method of the electronic device according to various embodiments of the disclosure, the determining whether the movement of the input using the digital pen occurs in the hinge area of the display may include further determining whether the movement of the input using the digital pen occurs in the hinge area of the display by using at least one of a pressure and a start coordinate of the input using the digital pen periodically occurring and a speed, an acceleration, an angular speed, and an angular acceleration of the movement of the input using the digital pen.

In the operating method of the electronic device according to various embodiments of the disclosure, the periodically further determining whether the movement of the input using the digital pen occurs in the hinge area of the display by using at least one of the pressure and the start coordinate of the input using the digital pen occurring and the speed, the acceleration, the angular speed, and the angular acceleration of the movement of the input using the digital pen may include determining whether the movement of the input using the digital pen occurs in the hinge area of the display by using a machine learning model trained using at least some of the pressure and the start coordinate of the input using the digital pen and the speed, the acceleration, the angular speed, and the angular acceleration of the movement of the input using the digital pen.

In the operating method of the electronic device according to various embodiments of the disclosure, the correcting of the coordinate of the input using the digital pen, where the input using the digital pen and the hovering about the input occur at a plurality of positions, may include correcting a coordinate of the input using the digital pen by using a coordinate of a position at which hovering closest to a touch input using the digital pen occurs.

In the operating method of the electronic device according to various embodiments of the disclosure, the correcting of the coordinate of the input using the digital pen, where the input using the digital pen and the hovering about the input occur at a plurality of positions, may include correcting the coordinate of the input using the digital pen by using a coordinate of some of the plurality of positions at which the hovering occurs.

In the operating method of the electronic device according to various embodiments of the disclosure, the correcting of the coordinate of the input using the digital pen may include correcting the coordinate of the input using the digital pen by using a machine learning model trained using a coordinate of a touch input using the digital pen of which an intensity is identified and the coordinate of the position at which the hovering occurs.

In the operating method of the electronic device according to various embodiments of the disclosure, the input using the digital pen may be recognized by an electromagnetic resonance (EMR) method.

In the operating method of the electronic device according to various embodiments of the disclosure, the determining whether the input using the digital pen needs correcting may include determining that the input using the digital pen does not need correcting when a pressure of the input using the digital pen is measured within a threshold value.

The operating method of the electronic device according to various embodiments of the disclosure may further include identifying whether an input coordinate prediction function of an executed application is activated, and deactivating the input coordinate prediction function when the input coordinate prediction function is identified as being activated.

A non-transitory computer-readable storage medium storing instructions that, when executed by a processor, may cause the processor to perform the operating method of the electronic device as described above according to various embodiments of the disclosure.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a display;
a processor; and
memory storing instructions that, when executed by the processor, cause the electronic device to:
detect movement of an input using a digital pen on the display,
determine whether the movement of the input occurs in a hinge area of the display based on using a machine learning model trained using at least some of a pressure and a start coordinate of a touch input and a speed, an acceleration, an angular speed, and an angular acceleration of the movement of the touch input to distinguish between the hinge area and a non-hinge area of the display, determine whether to correct the input in a case that it is determined that the movement occurs in the hinge area, identify whether the pressure of the touch input is greater than a first threshold value, in a case that it is determined to correct the input, when the pressure of the touch input is greater than the first threshold value, identify the touch input as a character writing input, display a stroke of the character according to the movement of the touch input, when the pressure of the touch input is less than the first threshold value, detect a hovering input of a hand holding the digital pen, identify whether an intensity of the hovering input is less than a second threshold value, when the intensity of the hovering input is greater than the second threshold value, identify the touch input as the character writing input, when the intensity of the hovering input is less than the second threshold value, identify whether an acceleration of the movement of the touch input is greater than a third threshold value, when the acceleration of the movement of the touch input is less than the third threshold value, identify the touch input as the character writing input, and when the acceleration of the movement of the touch input is greater than the third threshold value, identify the touch input as a skipping input for not displaying the stroke of the character according to the movement of the touch input.

2. The electronic device of claim 1, wherein the instructions are configured to, when executed by the processor, cause the electronic device to determine whether the movement of the touch input occurs in the hinge area of the display using a physical coordinate of the display.

3. The electronic device of claim 2, wherein the instructions are configured to, when executed by the processor, cause the electronic device to periodically further determine whether the movement of the touch input occurs in the hinge area of the display by using at least one of the pressure and the start coordinate of the touch input and the speed, the acceleration, the angular speed, and the angular acceleration of the movement of the touch input.

4. The electronic device of claim 1, wherein the hovering input is detected at a plurality of positions, and wherein the instructions are configured to, when executed by the processor, cause the electronic device to correct a coordinate of the touch input by using a coordinate of a position at which the hovering input closest to the touch input is detected.

5. The electronic device of claim 1, wherein the hovering input is detected at a plurality of positions, and wherein the instructions are configured to, when executed by the processor, cause the electronic device to correct the coordinate of the touch input by using a coordinate of some of the plurality of positions of the hovering input.

6. The electronic device of claim 1, wherein the instructions are configured to, when executed by the processor, cause the electronic device to recognize the touch input by an electromagnetic resonance (EMR) method.

7. The electronic device of claim 1, wherein the instructions are configured to, when executed by the processor, cause the electronic device to identify whether an input coordinate prediction function of an executed application is activated, and deactivates the input coordinate prediction function in case that the input coordinate prediction function is identified as being activated.

8. An operating method of an electronic device, the method comprising:

detecting movement of an input using a digital pen on a display of the electronic device;

determining whether the movement of the input occurs in a hinge area of the display based on using a machine learning model trained using at least some of a pressure and a start coordinate of a touch input and a speed, an acceleration, an angular speed, and an angular acceleration of the movement of the touch input to distinguish between the hinge area and a non-hinge area of the display;

determining whether to correct the input in a case that it is determined that the movement occurs in the hinge area;

when detecting a movement of the touch input using a digital pen, identifying whether the pressure of the touch input is greater than a first threshold value;

identifying the touch input as a character writing input, in a case that it is determined to correct the input;

displaying a stroke of the character according to the movement of the touch input;

when the pressure of the touch input is less than the first threshold value, detecting a hovering input of a hand holding the digital pen;

identifying whether an intensity of a hovering input is less than a second threshold value;

when the intensity of the hovering input is greater than the second threshold value, identifying the touch input as the character writing input;

when the intensity of the hovering input is less than the second threshold value, identifying whether an acceleration of the movement of the touch input is greater than a third threshold value;

when the acceleration of the movement of the touch input is less than the third threshold value, identifying the touch input as the character writing input; and when the acceleration of the movement of the touch input is greater than the third threshold value, identifying the touch input as a skipping input for not displaying the stroke of the character according to the movement of the touch input.

9. The method of claim 8, wherein the determining whether the movement of the touch input occurs in the hinge area of the display comprises determining whether the movement occurs in the hinge area of the display using a physical coordinate of the display.

10. The method of claim 9, wherein the determining whether the movement of the touch input occurs in the hinge area of the display comprises further determining whether the movement of the touch input occurs in the hinge area of the display by using at least one of the pressure and the start coordinate of the touch input periodically occurring and the speed, the acceleration, the angular speed, and the angular acceleration of the movement of the touch input.

11. The method of claim 8, wherein the hovering input is detected at a plurality of positions, and the method further comprises correcting a coordinate of the touch input by using a coordinate of a position at which the hovering input closest to the touch input is detected.

12. The method of claim 8, wherein the hovering input is detected at a plurality of positions, and the method comprises correcting the coordinate of the touch input by using a coordinate of some of the plurality of positions of the hovering input.

13. The method of claim 8, further comprising:
- identifying whether an input coordinate prediction function of an executed application is activated; and
- deactivating the input coordinate prediction function in case that the input coordinate prediction function is identified as being activated.

14. A non-transitory computer-readable storage medium storing instructions that, when executed by a processor, cause the processor to perform the operating method of the electronic device of claim 8.

* * * * *